United States Patent
Ishizu

(10) Patent No.: US 7,515,625 B2
(45) Date of Patent: Apr. 7, 2009

(54) MULTIPATH LASER APPARATUS USING A SOLID-STATE SLAB LASER ROD

(75) Inventor: Mitsuo Ishizu, Koganei (JP)

(73) Assignee: National Institute of Information and Communications Technology, Incorporated Administrative Agency, Koganei-shi (JP)

( * ) Notice: Subject to any disclaimer, the term of this patent is extended or adjusted under 35 U.S.C. 154(b) by 33 days.

(21) Appl. No.: 11/471,493

(22) Filed: Jun. 21, 2006

(65) Prior Publication Data

US 2007/0002920 A1    Jan. 4, 2007

(30) Foreign Application Priority Data

Jun. 21, 2005 (JP) .............................. 2005-180521
May 23, 2006 (JP) .............................. 2006-142734

(51) Int. Cl.
*H01S 3/06* (2006.01)

(52) U.S. Cl. ......................... 372/66; 372/43.01; 372/69; 372/70

(58) Field of Classification Search ............... 372/43.01, 372/66, 69, 70
See application file for complete search history.

(56) References Cited

U.S. PATENT DOCUMENTS

| 4,902,127 A | | 2/1990 | Byer et al. |
| 5,084,889 A | * | 1/1992 | Tajima ........................ 372/39 |
| 5,172,263 A | | 12/1992 | Hale |
| 5,181,223 A | | 1/1993 | Baer |
| 5,479,430 A | * | 12/1995 | Shine et al. .................... 372/66 |
| 5,615,043 A | | 3/1997 | Plaessmann et al. |

(Continued)

FOREIGN PATENT DOCUMENTS

DE    100 25 485 A1    12/2001

OTHER PUBLICATIONS

Ichiro Shoji, et al., "Optical properties and laser characteristics of highly $Nd^{3+}$-doped $Y_3Al_5O_{12}$ ceramics", Applied Physics Letters, vol. 77, No. 7, Aug. 14, 2000, pp. 939-941.

(Continued)

*Primary Examiner*—Minsun Harvey
*Assistant Examiner*—Yuanda Zhang
(74) *Attorney, Agent, or Firm*—Oblon, Spivak, McClelland, Maier & Neustadt, P.C.

(57) ABSTRACT

A laser apparatus has a multipath solid-state slab laser rod and an excitation source that excites it, and uses a solid-state slab laser rod that has a trapezoid or parallelogram-shaped cross section along the optical path, that is provided with six or more faces and that has a light amplifying effect or a nonlinear optical effect. The light that is incident to the laser rod is totally reflected at the incident-light end face and exit end face of the laser rod, passes back through the interior of the laser rod a plurality of times, e.g., three times, and then exits. For light amplification, excitation light is irradiated from the side face. In addition, for nonlinear optical effects, the z-axis of a nonlinear optical crystal is disposed so as to be orthogonal to the plane of the optical path, and the temperature of the solid-state slab laser rod is kept at the phase-matching temperature. This laser apparatus of this configuration solves drawbacks of prior-art laser rods so that the high conversion rate from excitation light to laser light is obtained at a high laser gain.

12 Claims, 19 Drawing Sheets

U.S. PATENT DOCUMENTS

| | | | |
|---|---|---|---|
| 5,651,021 A * | 7/1997 | Richard et al. | 372/92 |
| 5,751,472 A | 5/1998 | Jeys et al. | |
| 6,134,258 A | 10/2000 | Tulloch et al. | |
| 6,219,361 B1 * | 4/2001 | Guch et al. | 372/10 |
| 6,373,866 B1 | 4/2002 | Black | |
| 7,065,121 B2 * | 6/2006 | Filgas et al. | 372/64 |
| 7,289,548 B2 * | 10/2007 | Ishizu | 372/94 |
| 2005/0195879 A1 * | 9/2005 | Ishizu | 372/66 |
| 2006/0114961 A1 * | 6/2006 | Manni | 372/70 |

OTHER PUBLICATIONS

Jianren Lu, et al., "72 W Nd:$Y_3Al_5O_{12}$ ceramic laser", Applied Physics Letters, vol. 78, No. 23, Jun. 4, 2001, pp. 3586-3588.

Kevin J. Snell, et al., "Diode-pumped, High-Power CW and Modelocked Nd:YLF Lasers", Advanced Solid-State Lasers, vol. 34, 2000 TOPS, pp. 55-59.

* cited by examiner

F I G . 1 7
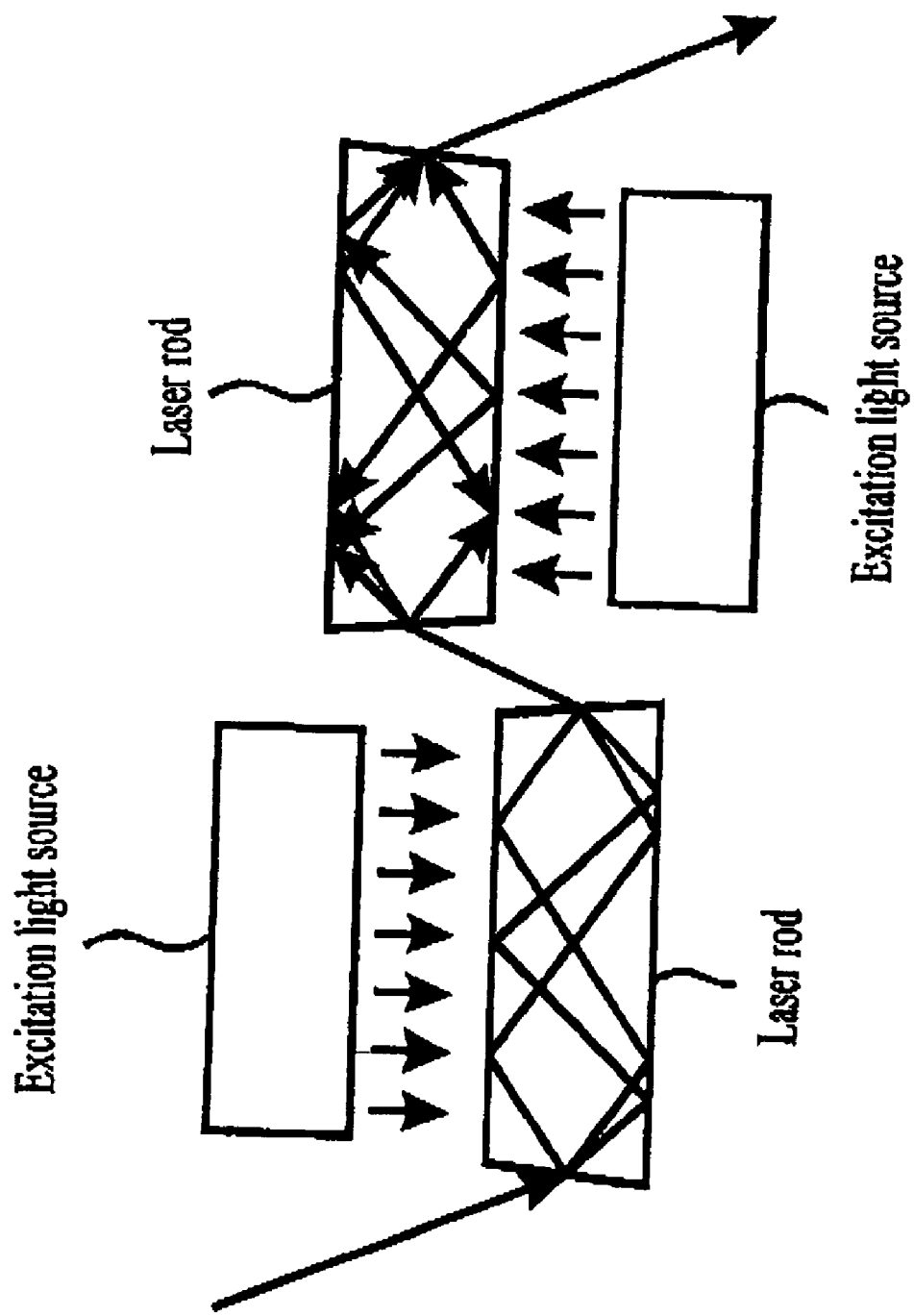

F I G. 18
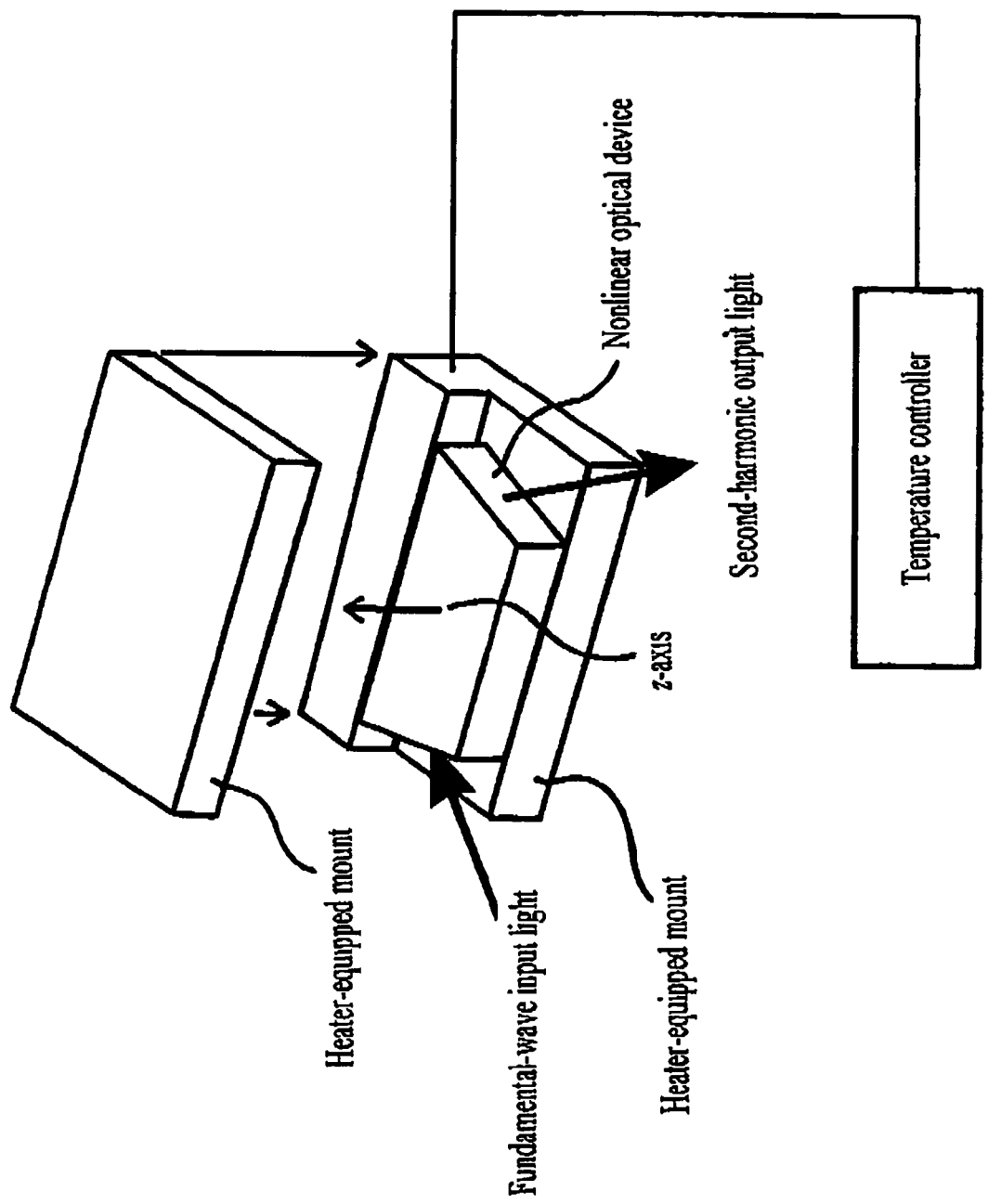

MULTIPATH LASER APPARATUS USING A SOLID-STATE SLAB LASER ROD

BACKGROUND OF THE INVENTION

1. Field of the Invention

This invention relates to a multipath laser apparatus using a solid-state slab laser rod that is able to implement a solid-state laser apparatus with a high efficiency in the conversion of excitation light to laser light, and can be applied to Nd:YAG laser apparatus, Nd:YLF laser apparatus and Yb:YAG laser apparatus, for example.

2. Description of the Prior Art

The efficiency of conversion of electrical input to laser output in a solid-state laser apparatus is the most important among various factors affecting the performance of a laser. In lamp-excited lasers, the efficiency of the conversion of electricity to light by the lamp itself is poor and its light-emission spectrum is wide, so much of the light cannot be absorbed by the laser rod, so the laser apparatus must have a large power consumption. In laser diode (LD)-excited lasers, the conversion efficiency of the LD itself is high and the spectrum of the emitted light is tuned to the absorption peak of the rod, so a higher conversion efficiency is obtained, but this is still not enough.

The causes of this include the small excitation light absorption cross section of the active ions of the solid-state laser that prevents the laser rod from efficiently absorbing all of the excitation light, and the small induced emission cross section that prevents the energy stored in the rod from being efficiently converted to laser light.

In order to increase the conversion efficiency of a laser apparatus, these properties must be compensated for by some method. Previous known methods of increasing the energy conversion efficiency of a laser apparatus include methods (1) and (2) below.

(1) To Increase the Doping of Laser-Active Ions in the Solid-State Laser Rod.

This is a method of increasing the active ion concentration to increase the excitation light absorption efficiency and laser gain. For example, U.S. Pat. No. 3,640,887 Latent Reference 1) and U.S. Pat. No. 3,897,358 (Patent Reference 2) recite the characteristics and method of manufacture of a ceramic laser rod containing neodymium (Nd) and other rare-earth ions. With a neodymium YAG (Nd:YAG) laser, the doping of laser-active ions can be increased in the ceramic more than in the single crystal. Moreover, larger-sized laser rods can be easily manufactured. In addition, "Optical properties and laser characteristics of highly $Nd^{3+}$-doped $Y_3Al_5O_{12}$ ceramics," *Applied Physics Letters*, Vol. 77, No. 7, pp. 939-941 (2000) (Non-Patent Reference 1) and "72W Nd:$Y_3Al_5O_{12}$ ceramic laser," *Applied Physics Letters*, Vol. 78, No. 23, pp. 3586-3588 (2001) (Non-Patent Reference 2) also describe improvement of the oscillation characteristics of Nd:YAG ceramic lasers.

However, if the doping of laser-active ions is increased, disturbances in the refractive index distribution of the laser rod typically become evident. In addition, drops in optical quality such as reduced high-level lifetime in excitation occur more readily. These manifestations of disturbances in the refractive index distribution and drops in optical quality may become the cause of deterioration in the transverse modes of the laser beam thus obtained, and bring about performance drops as a laser medium. There are thus limits how much the doping can be increased.

In addition, in fundamentally transverse mode-oscillating lasers and high-power lasers, if there is heating within the interior of the laser rod, then this generates temperature distributions in the interior, thus giving the laser medium distortion. This distortion gives rise to decreased quality in the laser rod, birefringence and the like, so the transverse modes of oscillation diverge from the fundamental transverse mode. In order to prevent this, it is necessary to decrease the doping of active ions in the laser rod.

In addition, in order to increase the conversion efficiency to laser light, it is possible to use a laser rod with decreased doping to the level that high optical quality is kept, but in order to do this, it is necessary to:

(2) Use a Laser Rod that has a High Absorption of Excitation Light and has a High Laser Gain.

In order to increase the absorption of excitation light, the propagation length of excitation light in the rod must be made sufficiently longer than the absorption length (the length before attenuating to l/e, where e is the base of the natural logarithm). In other words, it is necessary to increase the excitation volume.

On the other hand, in order to increase the laser gain, it is necessary to raise the excitation density of the laser rod and thus increase the laser gain and also decrease the diameter of the oscillation mode and make the fundamental transverse mode more readily selected, or namely reduce the mode volume.

Thus, it is necessary to increase the excitation volume and reduce the mode volume in order to increase the energy conversion efficiency of the laser apparatus. However, these are contradictory conditions so reconciling them is difficult in a typical laser apparatus according to the prior art.

However reconciling these conditions is known to be possible by adopting multiple optical paths within the laser rod. Here, adopting multiple paths means causing the laser light to be reflected back and forth within the laser rod over optical paths that are shifted spatially a little at a time. It is thus possible to increase the excitation volume and increase the excitation light absorbance. Moreover, this causes the refractive index to vary uniformly within the laser rod, so the laser beam cross section is resistant to widening and the mode volume is kept small. In addition, in order to effectively use the energy stored within the laser rod, it becomes necessary to make the laser beam cross section equal over all sections of the laser rod, thus reducing the optical strength for induced emission.

As a result, the optical path length within the laser rod is multiplied by the rod length multiple, so the laser gain can be increased and finally the saturation amplification gain can be obtained in the laser rod used as the laser amplifier. Obtaining the saturation amplification gain in this manner is one indicator that the accumulated energy can be effectively converted to laser light, so many methods of adopting multiple paths have been proposed.

For example, U.S. Pat. No. 4,902,127 (Patent Reference 3) shown in FIG. 1 discloses a triple-path solid-state laser amplifier for eye-safe wavelengths comprising a slab rod and mirror reflectors. In addition, U.S. Pat. No. 5,172,263 (Patent Reference 4) discloses a quadruple-path solid-state laser amplifier comprising an orthogonal prism and plane mirrors. In addition, U.S. Pat. No. 5,615,043 (Patent Reference 5) discloses a confocal resonator that can be adapted to any of a solid-state laser, a liquid laser and a gas laser, along with a multipath laser amplifier that uses white cells. Moreover, U.S. Pat. No. 5,751,472 (Patent Reference 6) discloses multiple optical paths of a parametric oscillator/amplifier based on a 180° return prism and lenses and mirror reflectors. In addition, JP H10-041565 A discloses an octuple-path laser amplifier based on a wavelength plate, optical rotator and hexagonal laser rod.

In addition, as shown in FIG. 2, recently "Diode-pumped High-power CW and Modelocked Nd:YLF Lasers," *Advanced Solid-State Lasers,* 2000 TOPS Vol. 34, Optical Society of America, Washington D.C. (2000) (Non-Patent Reference 3) describes an Nd:YLF laser wherein an increase in the overall efficiency and oscillation in transverse fundamental modes are obtained by a method wherein plane mirrors are placed at either end of a laser rod, and the light is caused to be reflected back and forth several times within the rod. In each of these methods, the multiple paths are implemented using mirror reflectors, reflector prisms or other reflectors outside the laser rod.

However, the number of optical components required to provide multiple optical paths in these laser apparatus becomes large. Moreover, precise adjustment is required in their placement. They thus have drawbacks in that the structure of the laser apparatus becomes complex and the size of the apparatus itself becomes large.

Moreover, because optical losses are unavoidable in the non-reflective coating at the laser rod ends and in the reflection by reflectors, these losses accumulate each time the laser light travels back and forth between the ends of the laser rod, resulting in the effect of the increased laser gain being reduced. Moreover, with the conventional multipath devices, adjacent optical paths vary in direction by only a very small amount, so they had a drawback in that the path distribution within the rod could not be adequately averaged.

An object of the present invention is to provide a laser rod with multiple paths that overcomes these drawbacks to give a high conversion efficiency and is able to readily generate high-quality laser light with regard to the oscillation mode.

In this manner, multiple optical paths are used in laser apparatus in order to increase the energy conversion efficiency of the laser apparatus, but the number of optical components required to provide multiple optical paths in these laser apparatus becomes large, and moreover precise adjustment is required in their placement, so there are drawbacks in that the structure of the laser apparatus becomes complex and the size of the apparatus itself becomes large. In addition, with nonlinear optical elements, the relationship between the direction of propagation of the excitation light and generated light within crystals is normally determined as a relationship that satisfies the phase matching conditions with respect to the crystal axes. For this reason, with nonlinear optical elements, they are fundamentally manufactured so as to have a straight, one-pass optical path or a single back-and-forth optical path, and thus they do not have multiple optical paths and do not give adequate wavelength conversion efficiency.

With this invention, it is possible to obtain a solid-state laser apparatus with a high efficiency of conversion from excitation light to laser light.

SUMMARY OF THE INVENTION

The invention that achieves this object will now be explained in terms of its principles.

The present invention relates to a laser rod wherein laser light that is incident to the laser rod is totally reflected at the incident-light end face and light exit end face of the laser rod, passes back through the interior of the laser rod a plurality of times, e.g., three times, and then exits. As a result of the disposition of this optical path, a high conversion rate from excitation light to laser light and a high laser gain are obtained, so the drawbacks of the prior-art laser rods can be improved.

The laser apparatus using a solid-state slab laser rod according to the present invention is a laser apparatus comprising a multipath solid-state slab laser rod and an excitation source that excites it, and that uses a solid-state slab laser rod that has a trapezoid or parallelogram-shaped cross section along the optical path, that is provided with six or more faces and that has a light amplifying effect, comprising:

a solid-state slab laser rod that is able to amplify incident light and has an incident-light face A, a light exit face B, two parallel faces C and D, adjacent to the incident-light face A and light exit face B, that face each other and form a propagation path wherein light propagates while being reflected and faces E and F that follow the cross section, and an excitation light source that excites the solid-state slab laser rod from one of the six faces A through F, where the incident-light face A and exit face B are faces that face each other and the light that is incident upon light incident face A:

(1) is reflected by either face C or face D, or by both faces C and D, respectively, one or more times, (2) is totally reflected by exit face B, (3) is reflected by either face C or face D, or by both faces C and D, respectively, one or more times, and (4) is totally reflected by incident face A, and after repeating this light propagation a plurality of times, is reflected by either face C or face D, or by both faces C and D, respectively, one or more times, and the light generated by the nonlinear optical effect is output from the exit face B.

In one aspect, the present invention provides a laser apparatus using a solid-state slab laser rod that has a trapezoid or parallelogram-shaped cross section along the optical path and that uses a nonlinear optical crystal having a nonlinear optical effect, comprising:

a device that has a nonlinear optical effect on excitation light and has an incident face A for the excitation light, an exit ace B for light generated by the nonlinear optical effect, two parallel faces C and D, adjacent to the incident face A and exit face B, that face each other and form a propagation path wherein light propagates while being reflected and faces E and F that follow the cross section, where the incident-light face A and exit B are faces that face each other and the light that is incident upon incident face A:

(1) is reflected by either face C or face D, or by both faces C and D, respectively, one or more times, (2) is totally reflected by exit face B, (3) is reflected by either face C or face D, or by both faces C and D, respectively, one or more times, and (4) is totally reflected by incident face A, and after repeating this light propagation a plurality of times, is reflected by either face C or face D, or both faces C and D, respectively, one or more times, and the light generated by the nonlinear optical effect is output from the exit face B.

In another aspect, the present invention provides a laser apparatus using a solid-state slab laser rod that has a cross section along the optical path in a shape equivalent to a trapezoid X comprising a side face $A_X$, side face $B_X$, upper base face $C_X$ and lower base face $D_X$ joined to a similar trapezoid Y comprising a side face $A_Y$, side face $B_Y$, upper base face $C_Y$ and lower base face $D_Y$, being provided with eight or more planes containing the side face $A_X$, side face $B_X$, upper base face $C_X$, lower base face $D_X$, side face $A_Y$, side face $B_Y$, upper base face $C_Y$ and lower base face $D_Y$, and that has a light amplifying effect, comprising.

a solid-state slab laser rod that is able to amplify incident light and has an incident-light face $A_X$, a light exit face $B_X$, two parallel faces $C_X$ and $C_Y$ that face each other and form a propagation path wherein light propagates and faces E and F that follow the cross section, and an excitation light source that excites the solid-state slab laser rod from one of the eight faces $A_X$, $B_X$, $A_Y$, $B_Y$, $C_X$, $C_Y$, E or F, where the incident-light face $A_Y$ and exit face $B_X$ are faces that face each other, and the light that is incident upon incident-light face $A_Y$:

(1) is reflected by either face $C_X$ or face $C_Y$, or by both faces $C_X$ and $C_Y$, respectively, one or more times, (2) is totally reflected by face $B_X$, (3) is reflected by either face $C_X$ or face $C_Y$, or by both faces $C_X$ and $C_Y$, respectively, one or more times, (4) is totally reflected by face $A_X$ or $A_Y$, (5) is reflected by either face $C_X$ or face $C_Y$, or by both faces $C_X$ and $C_Y$, respectively, one or more times, and the amplified light is output from the exit face $B_X$ or exit face $B_Y$.

In another aspect, the present invention provides a laser apparatus using a solid-state slab laser rod that has a cross section along the optical path in a shape equivalent to a trapezoid X comprising a side face $A_X$, side face $B_X$, face $C_X$ and face $D_X$ joined to a similar trapezoid Y comprising a side face $A_Y$, side face $B_Y$, face $C_Y$ and face $D_Y$, being provided with eight or more planes containing the side face $A_X$, side face $B_X$, face $C_X$ face $D_X$, side face $A_Y$, side face $B_Y$, face $C_Y$ and face $D_Y$, and that has a light amplifying effect, comprising:

a solid-state slab laser rod that is able to amplify incident light and has an incident-light face $A_X$, a light exit face $B_X$, two parallel faces $C_X$ and $C_Y$ that face each other and form a propagation path wherein light propagates and faces E and F that follow the cross section, and an excitation light source that excites the solid-state slab laser rod from one of the eight faces $A_X$, $B_X$, $A_Y$, $B_Y$, $C_X$, $D_Y$, E and F, where the incident-light face $A_Y$ and exit face $B_X$ are in parallel to each other, and the light that is incident upon incident-light face $A_Y$:

(1) is reflected by either face $C_X$ or face $D_Y$, or both faces $C_X$ and $D_Y$, respectively, one or more times, (2) is totally reflected by face $B_Y$, (3) is reflected by either face $C_X$ or face $D_Y$, or both faces $C_X$ and $D_Y$, respectively, one or more times (4) is totally reflected by face $A_Y$, (5) is reflected by either face $C_X$ or face $D_Y$, or both faces $C_X$ and $D_Y$, respectively, one or more times, (6) is totally reflected by face $B_X$, (7) is reflected by either face $C_X$ or face $D_Y$, or both faces $C_X$ and $D_Y$, respectively, one or more times, (8) is totally reflected by face $A_X$, and (9) is reflected by either face $C_X$ or face $D_Y$, or both faces $C_X$ and $D_Y$, respectively, one or more times and the amplified light is output from the exit face $B_X$.

In another aspect, the present invention provides a laser apparatus using a solid-state slab laser rod that has a cross section along the optical path in a shape equivalent to a right trapezoid having two adjacent right angles, where the two right trapezoids formed by bisecting this right trapezoid along a line parallel to its base are a trapezoid X comprising a side face $A_X$, side face $B_X$, upper base face $C_X$ and lower base face $D_X$ and a similar trapezoid Y comprising a side face $A_Y$, side face $B_Y$, upper base face $C_Y$ and lower base face $D_Y$, where the right trapezoids are such that lower base face $D_X$ lies atop upper base face $C_Y$, being provided with eight or more planes containing the side face $A_X$, side face $B_X$, upper base face $C_X$, side face $A_Y$, side face $B_Y$ and lower base face $D_Y$, and that has a light amplifying effect, comprising:

a solid-state slab laser rod that is able to amplify incident light and has an incident-light face $A_Y$, a light exit face $A_X$, two parallel faces $C_X$ and $D_Y$ that face each other and form a propagation path wherein light propagates and faces E and F that follow the cross section, and an excitation light source that excites the solid-state slab laser rod from one of the eight faces $A_X$, $B_X$, $A_Y$, $B_Y$, $C_X$, $D_Y$, E and F.

where the light that is incident upon incident-light face $A_Y$ and exits from face $A_X$:

(1) is reflected by either face $C_X$ or face $D_Y$, or both faces $C_X$ and $D_Y$, respectively, one or more times, (2) is totally reflected by face $B_X$, (3) is reflected by either face $C_X$ or face $D_Y$, or both faces $C_X$ and $D_Y$, respectively, one or more times, (4) is totally reflected by face $A_Y$, (5) is reflected by either face $C_X$ or face $D_Y$, or both faces $C_X$ and $D_Y$, respectively, one or more times, (6) is totally reflected by face $B_Y$, (7) is reflected by either face $C_X$ or face $D_X$, or both faces $C_X$ and $D_Y$, respectively, one or more times, (8) is totally reflected by face $A_X$, (9) is reflected by either face $C_X$ or face $D_Y$, or both faces $C_X$ and $D_Y$, respectively, one or more times,

(10) is totally reflected by face $B_Y$,

(11) is reflected by either face $C_X$ or face $D_Y$, or both faces $C_X$ and $D_Y$, respectively, one or more times, and the amplified light is output from the exit face $A_X$.

In another aspect, the present invention provides a laser apparatus using a solid-state slab laser rod that has a cross section along the optical path in a shape equivalent to a trapezoid X comprising a side face $A_X$, side face $B_X$, upper base face $C_X$ and lower base face $D_X$ and a similar trapezoid Y comprising a side face $A_Y$, side face $B_Y$, upper base face $C_Y$ and lower base face $D_Y$, where the lower base face $D_X$ lies atop lower base face $D_Y$, being provided with eight or more planes containing the side face $A_X$, side face $B_X$, upper base face $C_X$, side face $A_Y$, side face $B_Y$ and upper base face $C_Y$, and that has a light amplifying effect, comprising:

a solid-state slab laser rod that is able to amplify incident light and has an incident-light face $A_Y$, a light exit face $A_X$, two parallel faces $C_X$ and $C_Y$ that face each other and form a propagation path wherein light propagates and faces E and F that follow the cross section, and an excitation light source that excites the solid-state slab laser rod from one of the eight faces $A_X$, $B_X$, $A_Y$, $B_Y$, $C_X$, $C_Y$, E and r, where the light that is incident upon face $A_Y$ and exits from face $A_X$:

(1) is reflected by either face $C_X$ or face $C_Y$, or by both faces $C_X$ and $C_Y$, respectively, one or more times, (2) is totally reflected by face $B_Y$, (3) is reflected by either face $C_X$ or face $C_Y$, or by both faces $C_X$ and $C_Y$, respectively, one or more times, (4) is totally reflected by face $A_X$, (5) is reflected by either face $C_X$ or face $C_Y$, or by both faces $C_X$ and $C_Y$, respectively, one or more times, (6) is totally reflected by face $B_X$ or $B_Y$, (7) is reflected by either face $C_X$ or face $C_Y$, or by both faces $C_X$ and $C_Y$, respectively, one or more times, (8) is totally reflected by face $A_Y$, (9) is reflected by either face $C_X$ or face $C_Y$, or by both faces $C_X$ and $C_Y$, respectively, one or more times,

(10) is totally reflected by face $B_X$, and

(11) is reflected by face $C_X$ or face $C_Y$ one or more times, and the amplified light is output from the exit face $A_X$.

The laser apparatus using a multipath solid-state slab laser rod according to the present invention is particularly such wherein the solid-state slab laser rod has a light amplifying effect and wherein excitation light is shined from either face C or face D or both faces and wherein a thermal conductor is provided on either face E or face F or both faces, thereby radiating heat.

The laser apparatus using a nonlinear optical crystal according to the present invention is particularly such wherein an anti-reflection film that is a film transparent to the excitation light is provided upon the excitation light incident face.

The laser apparatus using a multipath solid-state slab laser rod according to the present invention is particularly such wherein the angle of incidence of light with respect to light-incident face A or $A_X$ is made the Brewster angle.

The laser apparatus using a multipath solid-state slab laser rod according to the present invention is particularly such wherein the angle of incidence of light with respect to light-incident face A or $A_X$ is less than the Brewster angle, and an anti-reflection film with respect to the incident light is provided on the light-incident face.

The laser apparatus using a multipath solid-state slab laser rod according to the present invention is particularly such wherein total reflection is used for the reflections at (face C, face $C_X$ or face $C_Y$) and (face D, face $D_X$ or face $D_Y$).

The laser apparatus using a multipath solid-state slab laser rod according to the present invention is particularly such wherein a reflective film that reflects the incident light from the interior of the slab laser rod is provided on (face C, face $C_X$ or face $C_Y$) and (face D, face $D_X$ or face $D_Y$).

The above and other objects and features of the invention will become apparent from the following description made with reference to the drawings.

BRIEF EXPLANATION OF THE DRAWINGS

FIG. 17 is a schematic diagram of an example of the connection of laser rods in parallel.

FIG. 18 is a schematic diagram showing a nonlinear optical element.

DESCRIPTION OF THE PREFERRED EMBODIMENTS

Embodiments of the present invention will now be explained in detail. In the following explanation, those elements that have the same functions or analogous functions will be given the same symbols absent a specific reason not to do so.

Embodiment 1

Figure 3:
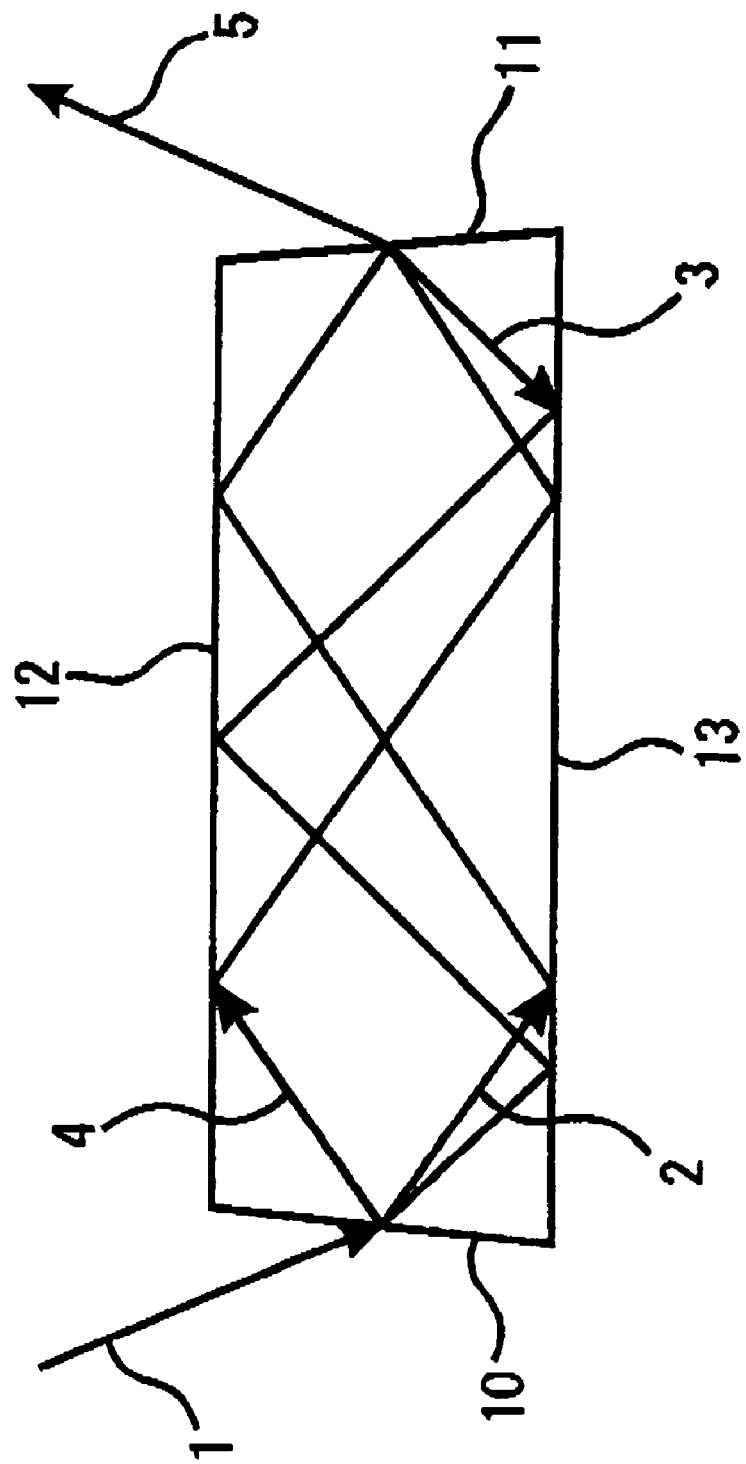
FIG. 3 is a diagram showing a triple-path laser rod.
Figure 4:
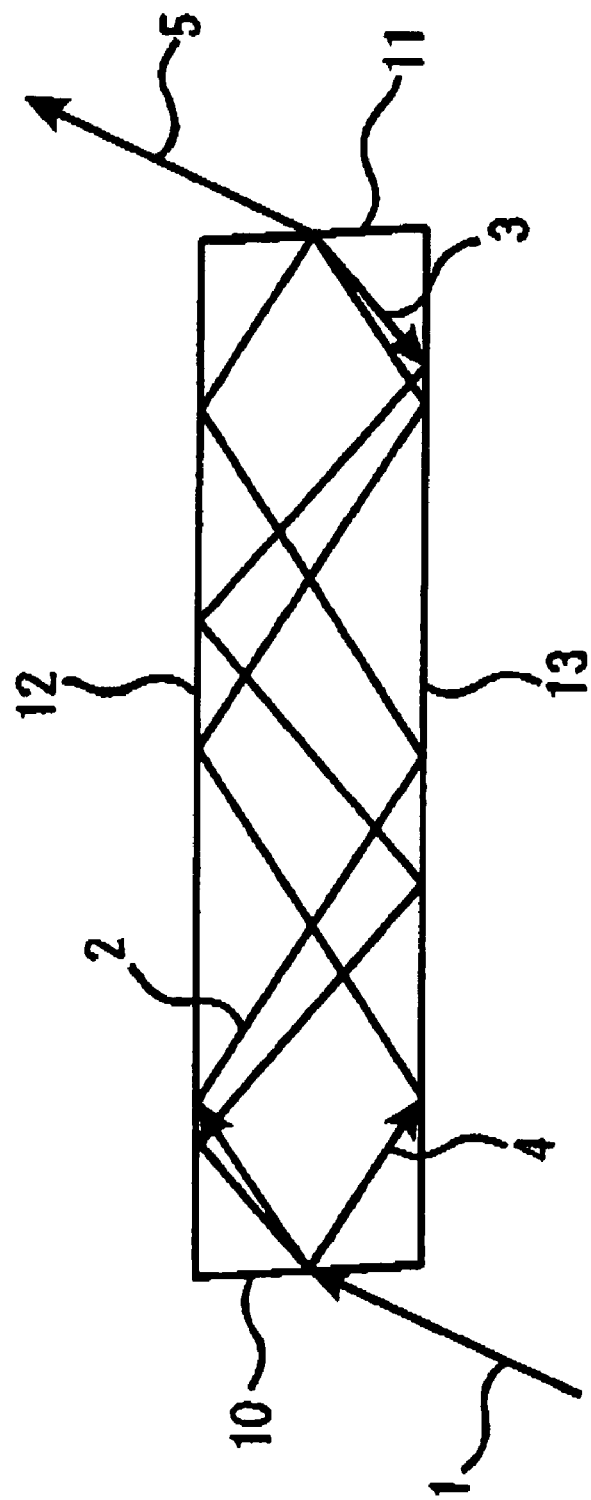
FIG. 4 is a diagram showing another triple-path laser rod.

The solid-state slab laser rod in the laser apparatus according to the present invention has a cross section in the shape of a long, thin trapezoid- or parallelogram-shaped slab as shown in FIG. 3 or FIG. 4. Each of the four faces 10, 11, 12 and 13 perpendicular to the plane of the paper is optically polished and a laser light-reflecting film is applied to the upper and lower long side faces 12 and 13. Laser light does not come into contact with the two faces that are parallel to the plane of the paper, so they may be either polished faces or left as rough faces.

A light beam 1 that is incident at the Brewster angle upon end face 10 of the laser rod travels along path 2 within the interior of the rod as its initial optical path, being reflected by the side faces until reaching end face 11. Here, end face 11 is inclined with respect to the central axis of the rod, so the light is totally reflected and then travels along path 3 at a larger angle from the central axis as its second optical path, thus returning to end face 10. End face 10 is inclined so that the angle from the central axis of the light beam becomes smaller, so the light that is totally reflected here travels along path 4 as its third optical path, thus returning to end face 11. Upon becoming incident upon end face 11 at the Brewster angle, the laser beam exits from the rod into the outside.

Conversely, in the case in which a laser beam is incident from end face 11 the laser beam will similarly pass through the interior of the rod three times and then exit from end face 10. The triple path is achieved by making use of the difference between the critical angle and the Brewster angle at the end face. In the case that the refractive index of the laser rod is high, it is possible to take advantage of total reflection in the side-face reflections, so the reflection of the laser beam within the rod can be made all total internal reflection.

Figure 5:
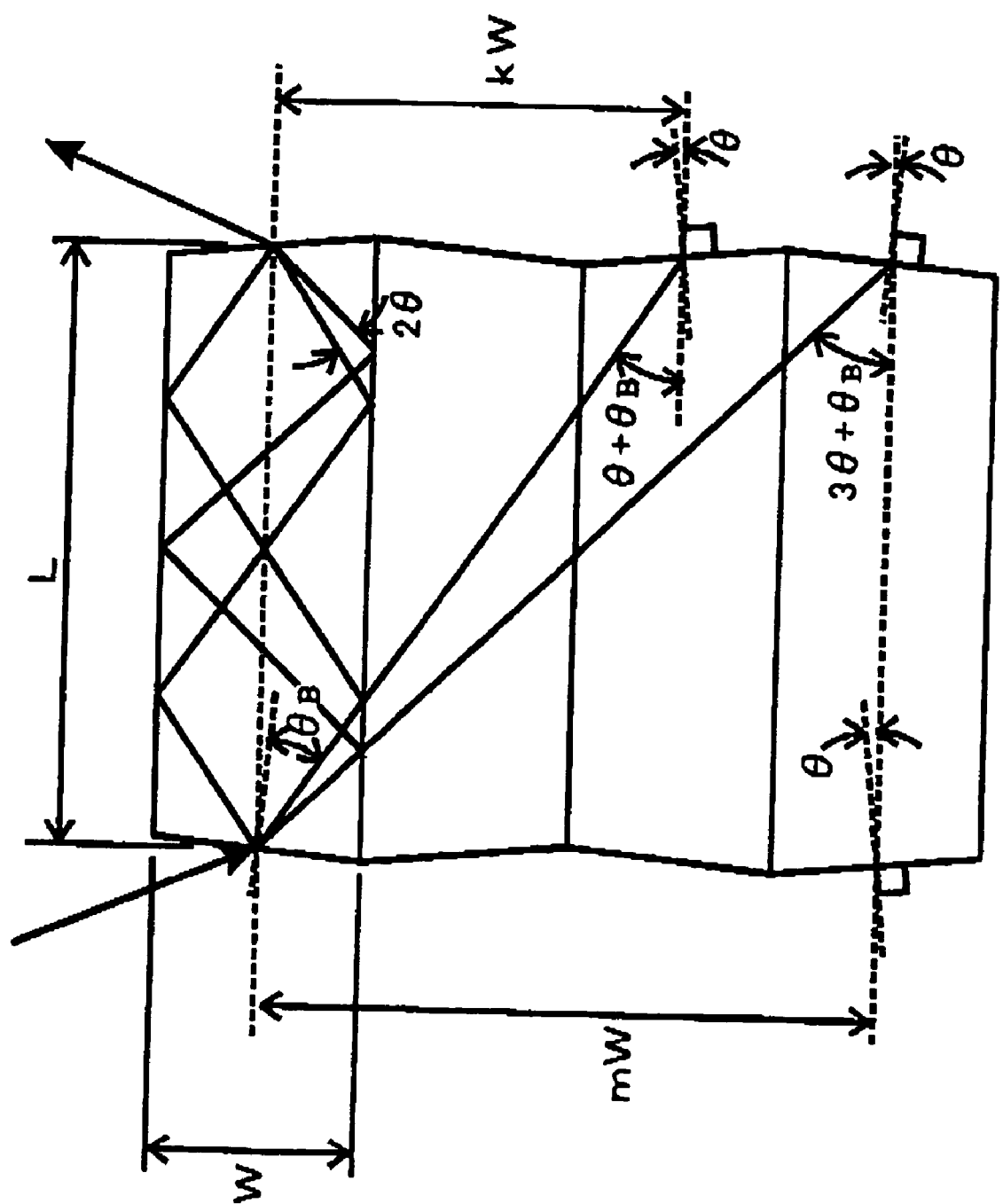
FIG. 5 is an optical path development.

In order to allow this triple path to be more readily understood, the optical path development in FIG. 5 is a diagram illustrating development of reflection at the top and bottom side faces. Taking $\theta_B$ to be the Brewster angle of the rod interior and n to be the refractive index of the rod, $\tan\theta_B = 1/n$. The extensions of path 2 and path 3, respectively, point toward the centers of the rod end faces that are drawn below after reflecting from the top and bottom side faces a number of times. Taking $\theta$ to be the angle between the line normal to the end face and the rod central axis, the angles between the extension lines of path 2 or path 3 and the central axis of the rod are $\theta+\theta_B$ and $3\theta+\theta_B$, respectively. The length L and width W of the rod shown in FIG. 5, and the end face angle of inclination $\theta$ are determined by the number of side-face reflections and the Brewster angle $\theta_B$. The number of side-face reflections is represented as (k, m) where k is the number of side-face reflections along path 2, and m is the number along path 3. One can see that L/W and θ relate as follows.

$$m = \frac{L}{W}\tan(3\theta + \theta_a) \quad (1)$$

$$2\theta + \theta_B > \theta_T \quad (2)$$

The conditions under which the triple path arises are k≧1 and m≧k and if one of k or m is an even number, the other is an odd number. The cross section of the rod becomes a trapezoid with right/left symmetry when k is an even number, or a parallelogram when odd. In order to solve equations (1) and (2), it is sufficient to substitute the values of k and m in the equations and find solutions for θ and L/W.

Moreover, the intermediate paths in the triple path illustrated in FIG. 3 must exhibit total reflection by both side faces, so the following equation must be satisfied.

$$\frac{\pi}{2} - \theta - \theta_B > \theta_T \quad (3)$$

Here, $\theta_T$ is the critical angle of the rod, where $\sin\theta_T = 1/n$. Moreover, for total reflection to occur at the side faces along path 2 and path 4, the following equation must be satisfied.

$$\frac{\pi}{2} - 3\theta - \theta_R > \theta_T \quad (4)$$

Moreover, for total reflection to occur at the side faces along path 3, the following equation must be satisfied.

$$k = \frac{L}{W}\tan(\theta + \theta_B) \quad (5)$$

The possible numbers of reflections in a YAG rod with a wavelength of 1064 nm, in order with the value of k from smallest to largest, are: (2, 3), (3, 4), (4, 7) and (5, 8). The values of L/W and θ are determined for each of these combinations. The values of L/W and θ as a function of the number of reflections are as illustrated in Table 1. The YAG crystal has a high refractive index, to take advantage of total internal reflection in the side-wall reflections also, there are combinations of numbers of reflections whereby all internal reflections are total reflection. However, depending on the numbers of reflections, the angles of reflection for total reflection at the end face and side face are near the critical angle. In addition, smaller numbers of reflections lessen the effects of rod manufacturing error. The (2, 3) combination of the number of reflections gives an adequate margin for the angle of incidence from the critical angle, so manufacture is simplified.

TABLE 1

L/W (top) and end-face angle θ (bottom, degrees) as a function of the number of reflections in an Nd:YAG rod

| | m = 3 | m = 4 | m = 5 | m = 6 | m = 7 | m = 8 |
|---|---|---|---|---|---|---|
| k = 1 | | L/W = 1.02<br>θ = 15.6° | | 0.96<br>17.4° | | 0.93<br>18.2° |

TABLE 1-continued

L/W (top) and end-face angle θ (bottom, degrees) as a function of the number of reflections in an Nd:YAG rod

| | m = 3 | m = 4 | m = 5 | m = 6 | m = 7 | m = 8 |
|---|---|---|---|---|---|---|
| k = 2 | L/W =<br>[2.91]<br>θ = [5.69°] | | 2.31<br>12.2° | | 2.10<br>14.8° | |
| k = 3 | | [4.67]<br>[3.93°] | | 3.78<br>9.68° | | 3.39<br>12.8° |
| k = 4 | | | [6.46]<br>[2.99°] | | [5.37]<br>[7.91°] | |
| k = 5 | | | | [8.26]<br>[2.40°] | | [7.03]<br>[6.64°] |

With the combinations according to this Table, the side-face reflections along path 2 and path 4 are all total reflection.

Combinations where the values are enclosed in square brackets [ ] indicate cases in which the side-face reflections along path 3 are also total reflection, The wavelength is 1064 nm, In the case of YLF which has an ordinary-ray refractive index of 1.448 at a wavelength of 1053 nm, while there are combinations in which path 2 and path 4 (the forward paths) among the multiple paths have total reflection in the side-face reflections, but total reflection cannot be used for the side-face reflection of path 3 (the backward path) because the angle of incidence becomes less than the critical angle. However, by applying a reflective film to the side face, a triple path can be obtained in the same manner as with YAG if the reflection of path 3 is the only reflection for which a reflective film is used, then reflection losses can be kept small. In the same manner as for the YAG rod, the values of L/W and θ as a function of the number of reflections for all possible numbers of reflections in a YLF rod are as illustrated in Table 2.

TABLE 2

L/W (top) and end-face angle θ (bottom, degrees) as a function of the number of reflections in an Nd:YLF rod

| | m = 3 | m = 4 | m = 5 | m = 6 | m = 7 | m = 8 |
|---|---|---|---|---|---|---|
| k = 1 | | L/W = 0.87<br>θ = 15.6° | | 0.825<br>15.85° | | 0.805<br>16.54° |
| k = 2 | L/W =<br>{2.35}<br>θ = {5.76°} | | {1.93}<br>{11.4°} | | 1.78<br>13.7° | |
| k = 3 | | | | {3.11}<br>{9.32°} | | 2.84<br>11.94° |
| k = 4 | | | | | {4.38}<br>{7.78°} | |
| k = 5 | | | | | | {5.70}<br>{6.64°} |

Combinations where the values are enclosed in curly brackets { } indicate cases in which the side-face reflections along path 2 and path 4 are total reflection.

The side-face reflections along path 3 are not total reflection in any of the combinations in this table.

In the triple-path laser rods above, a laser beam is incident to and exits from either end face at the Brewster angle. However, a nonreflecting film may be applied to these faces, thus causing the beam to be incident to and exit from the faces at a smaller angle of incidence, and thus total reflection can be used for the reflection at these faces in the middle of the triple path. In order to do this, it is sufficient for the variable $\theta_B$ in Equations (1) and (2) to be replaced with the internal angle of incidence $\theta_i$, so that $\theta$ and L/W are found from Equations (1) and (2) assuming $0 \leq \theta_i < \theta_B$, and for Equation (3) to be satisfied.

Figure 6:
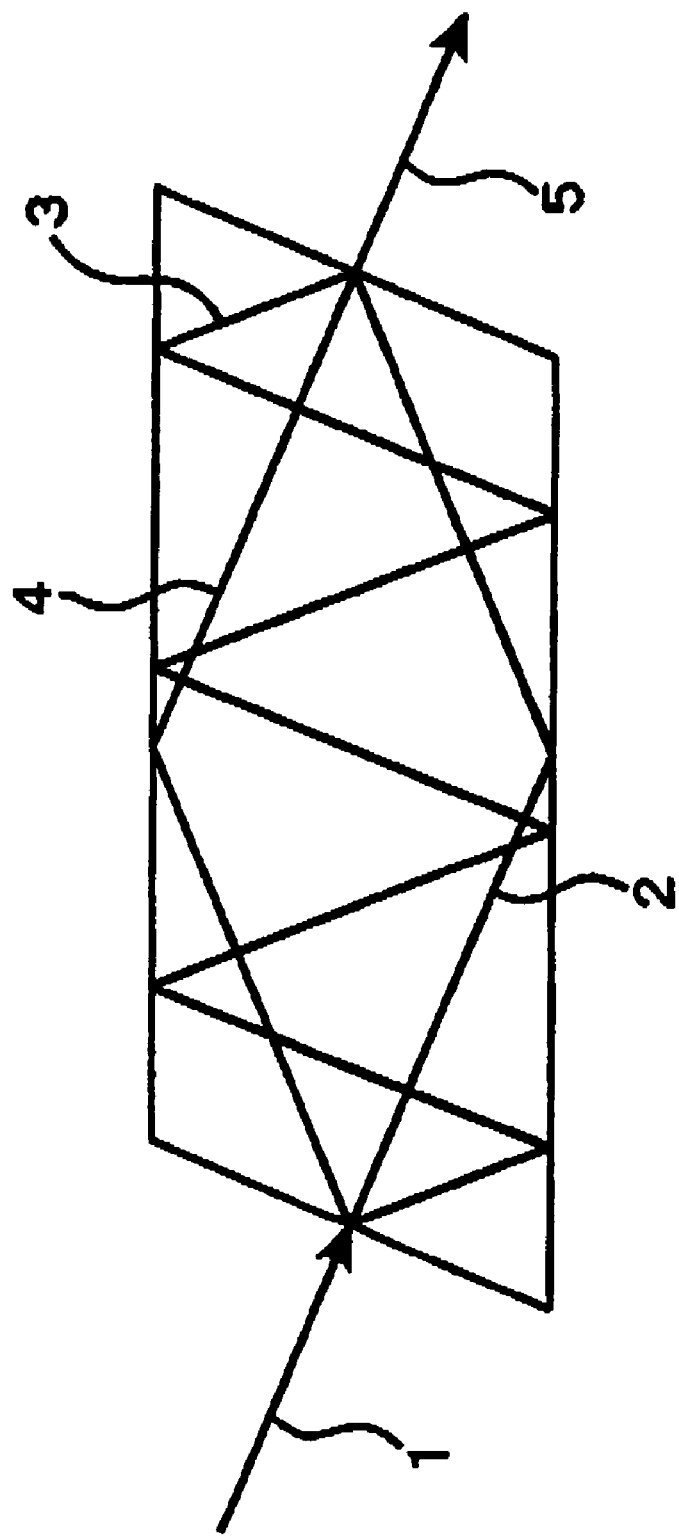
FIG. 6 is a diagram showing a triple-path laser rod with perpendicular light incidence.

As an example wherein a laser beam is incident perpendicular to either end face, a triple path is possible with a number of reflections of (1, 4) in the case of a YAG rod with a wavelength of 1064 nm. However, while total reflection can be used for the side-face reflections, total reflection on the end face is only 1.007 times the critical angle, so there is very little margin. The numbers of reflections of (1, 6), (1, 8), (1, 10) and the like do not allow total reflection to be used for the side-face reflections on the backward path, so a reflecting film is required on the side faces, but the side-face reflection and end-face reflection on the forward path have a margin of at least 1.37 times the critical angle, so a triple path is possible. The numbers of reflections of (2, 9), (2, 11) and the like also require a reflecting film for side-face reflection on the backward path, but there is sufficient margin for the other reflections and thus a triple path is possible. As an example, FIG. 6 shows an optical path diagram for a laser rod using the YAG rod above and a number of reflections of (1, 6).

As a similar example of perpendicular incidence of light, in the case of a laser beam with a wavelength of 1053 μm in the ordinary ray of a YLF rod, with the numbers of reflections of (1, 8) and (1, 10) and the like, total reflection cannot be used for the side-face reflection of the backward path, so a triple path is possible upon using a reflecting film on the side faces.

The advantage of the triple-path laser rod according to this Embodiment lies in that, in the same manner as an ordinary slab laser rod, the heterogeneous excitation distribution generated in side-face excitation can be averaged Out with respect to the direction within the plane containing the triple path. Moreover, upon comparing this laser rod against a straight-through type in which light passes through only once, with the same rod volume and same diameter of laser light, it has an advantage in that the induced emission coefficient of laser-active ions can be increased to an equivalent of three times that of the straight-through type.

In addition, in the case that total reflection is utilized for the side-face reflections, it has an advantage in that the optical losses from reflection can be made extremely small and the increase in induced emission due to the added path length can be taken advantage of to the fullest extent. Moreover, it has an advantage in that the manufacture of the rod can be completed with polishing alone. Moreover, even if a nonreflecting film in the excitation light wavelength is applied to the rod side faces in order to reduce the reflection losses of excitation light at these faces, this can increase the absorbance of excitation light with no effect on the total reflection of laser light.

The laser gain of this triple-path slab rod is roughly tripled, so when it is used in a laser oscillator or amplifier, the laser rod can be easily made to operate near the saturation amplification. Typically, when a laser oscillator operates in a state near saturation amplification operation, the optical losses of optical components have a lesser effect on oscillation. In addition, the conversion efficiency of energy stored in the rod increases, so it has an advantage in that the electro-optical conversion efficiency in laser operation can be greatly increased in comparison to the case of using a conventional laser rod.

A laser rod is excited by excitation light from an outside light source through an excitation face comprising one surface of the laser rod, or a combination thereof. The light source may be a lamp, laser diodes, sunlight or the like. A nonreflecting film in the excitation wavelength may be applied to the excitation face in order to increase the transmittance with respect to these excitation light sources. In addition, if the excitation face is the same as the incident-light face or the light exit face, this becomes end pumping, so this laser rod is also applicable to end pumping.

The base material used for the laser rod according to the present invention may be an isotropic laser rod crystal such as, for example, YAG, YSGG and other crystals belonging to the cubic system, or similarly isotropic laser materials such as laser glass and optically uniaxial laser crystals, for example, YLF, YVO$_4$ and Al$_2$O$_3$ crystals and the like, or ceramic YAG and other ceramic laser rods. In the case of YLF or other uniaxial laser crystals, laser light can be used in the ordinary ray if the c-axis is made perpendicular to the plane containing the multiple paths, or laser light can be used in the extraordinary ray if the c-axis is made parallel to this plane.

The laser-active ions with which this lasing base material can be doped include all active elements that have been utilized in the past in solid-state laser media. For example, Nd, Yb, Tm, Ho, Er and other rare-earth elements can be used along with Cr and other iron-family elements and Ti and the like.

Embodiment 2

Linking in Series

Figure 7:
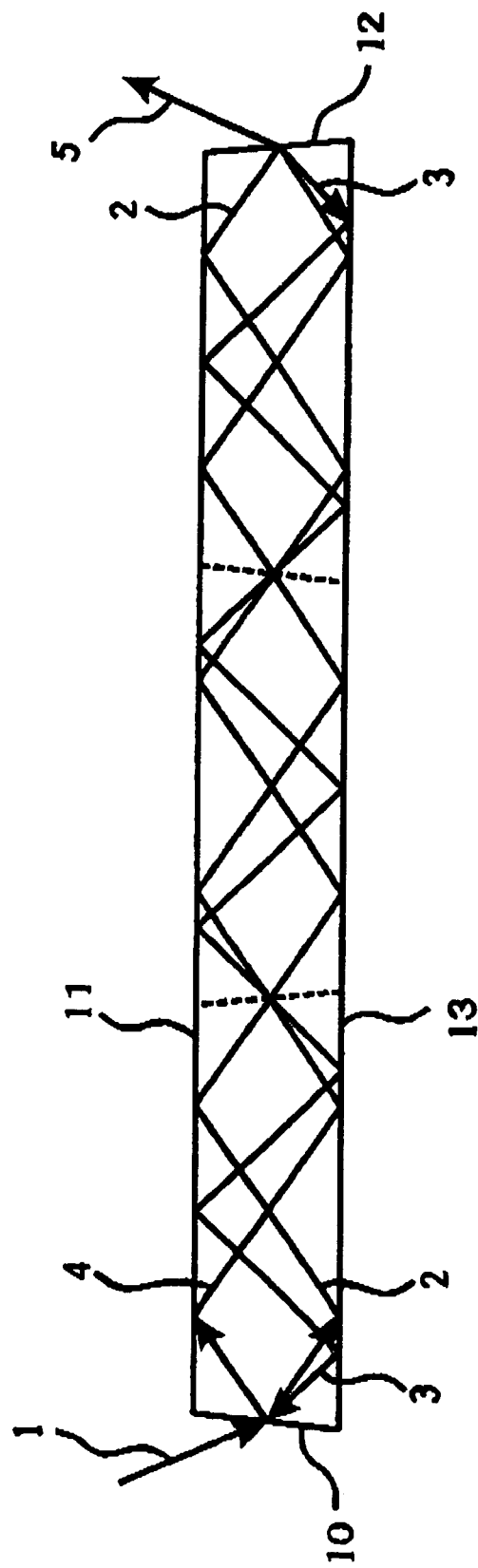
FIG. 7 is a diagram showing a laser rod that is equivalent to basic cells that are linked in series fashion.
Figure 8:
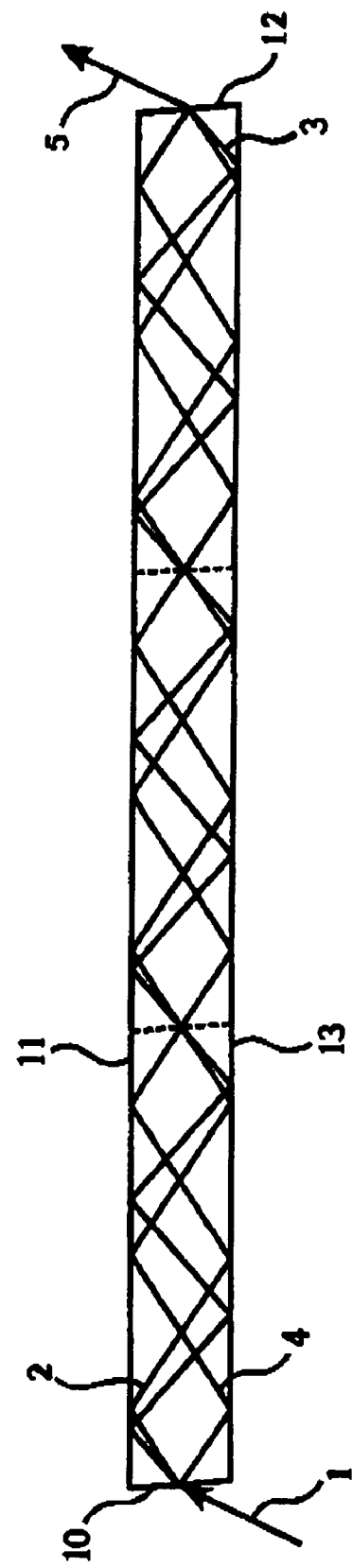
FIG. 8 is a diagram showing a laser rod that is equivalent to basic cells that are linked in series fashion.

Long rods disposed with the same triple paths can be manufactured by using the laser rods described above as basic cells, and conceptually linking identical cells in series at their end faces. In order to construct a triple path, it is necessary to add two basic cells at a time to the basic cell. This is in order to maintain the relationship of odd and even numbers in the number of reflections at the side faces present in the basic cells also in the linked rods. FIGS. 7 and 8 show examples of laser rods formed by linking three each of the basic cells with a number of side-face reflections of (2, 3) and (3, 4).

In the case of trapezoidal basic cells, they are linked linearly by vertically inverting each one in sequence. Parallelogram-shaped basic cells are linked without inverting.

Embodiment 3

Linking in Parallel

Figure 9:
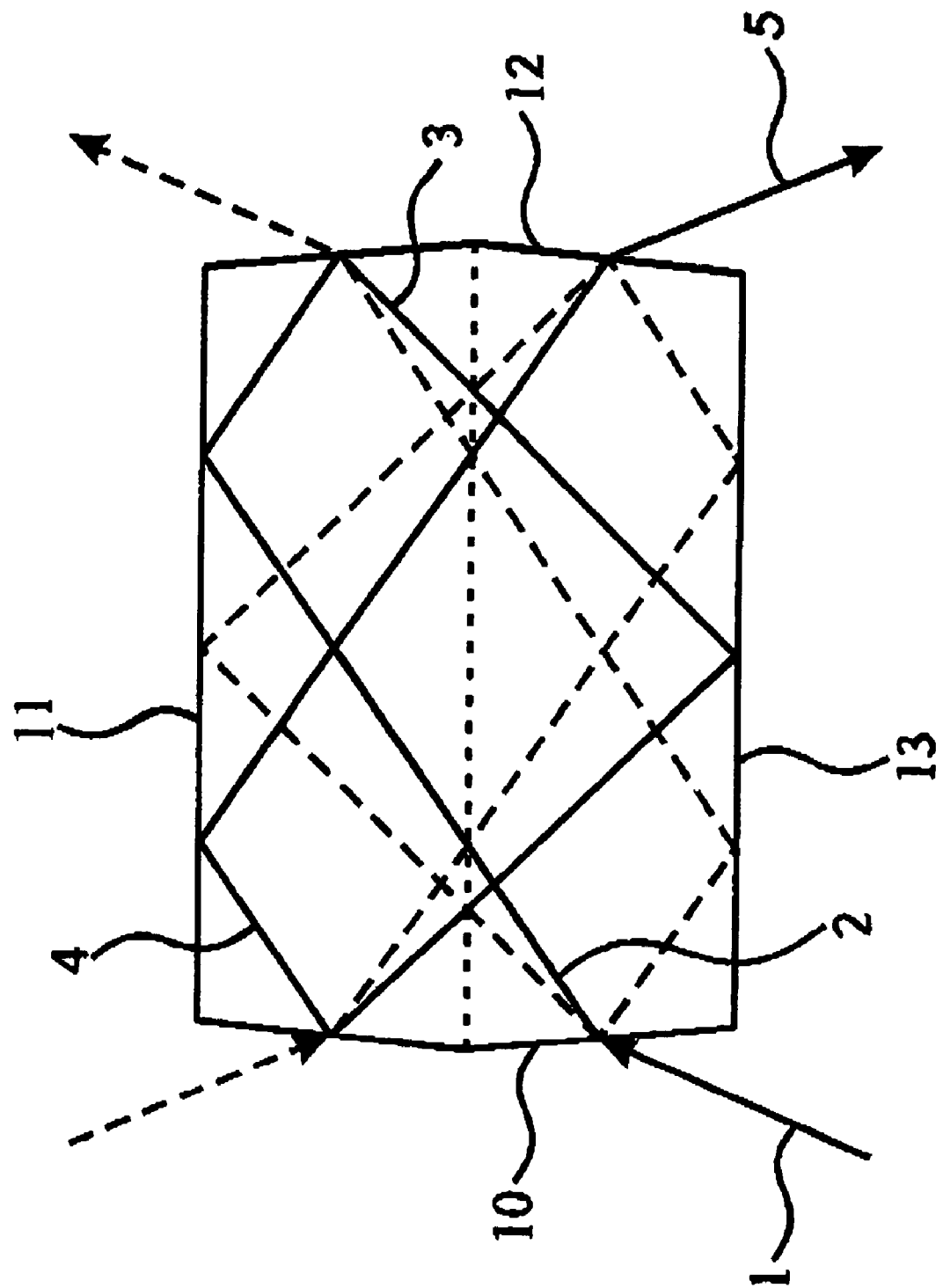
FIG. 9 is a diagram showing a laser rod that is equivalent to trapezoid-shaped basic cells that are linked in parallel fashion.

Alternately, triple or higher multiple paths can be disposed in rods formed by linking two basic cells in parallel at their side faces. Trapezoidal basic cells can be linked so that they are symmetrical about the connected faces. The completed rod has a hexagonal cross section. FIG. 9 shows an example of the linking of basic cells with numbers of side-face reflections of (2, 3). Two sets of triple paths are formed in this rod.

Figure 10:
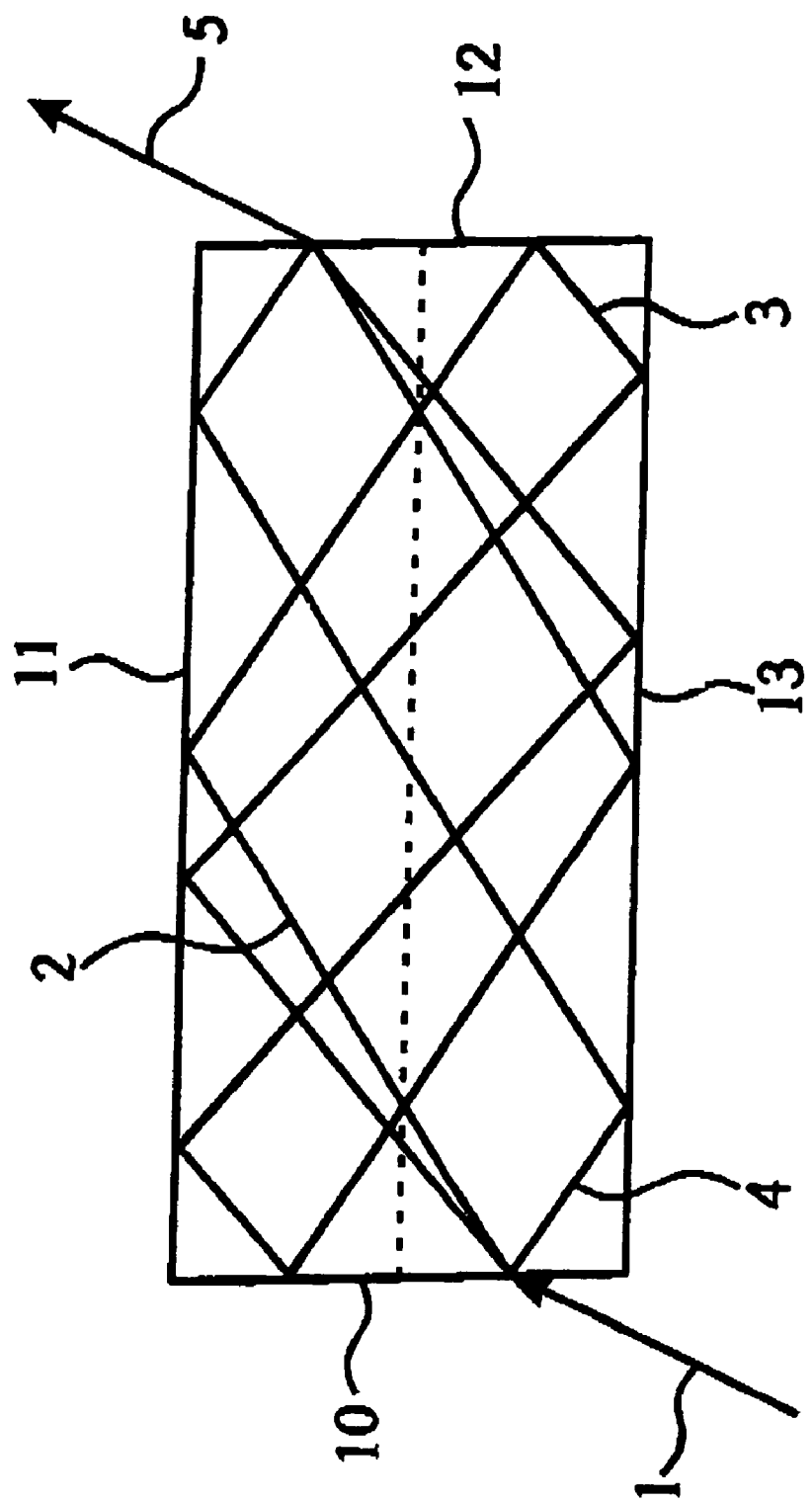
FIG. 10 is a diagram showing a laser rod that is equivalent to parallelogram-shaped basic cells that are linked in parallel fashion.

Two parallelogram-shaped basic cells are linked by the linear translation of one of the basic cells. The completed parallel-linked rod becomes a rod with a parallelogram-shaped cross section, as expected. FIG. 10 shows an example of the linking of basic cells with numbers of side-face reflections of (3, 4). One set of quintuple paths is formed in this rod.

In the above linked rods and those to be presented hereinafter, the way of thinking of the number of side-face reflections is to be such that when light passes through the linked faces between adjacent basic cells, this should also be counted as one reflection.

Embodiment 4

Series-Parallel Linking

Figure 11:
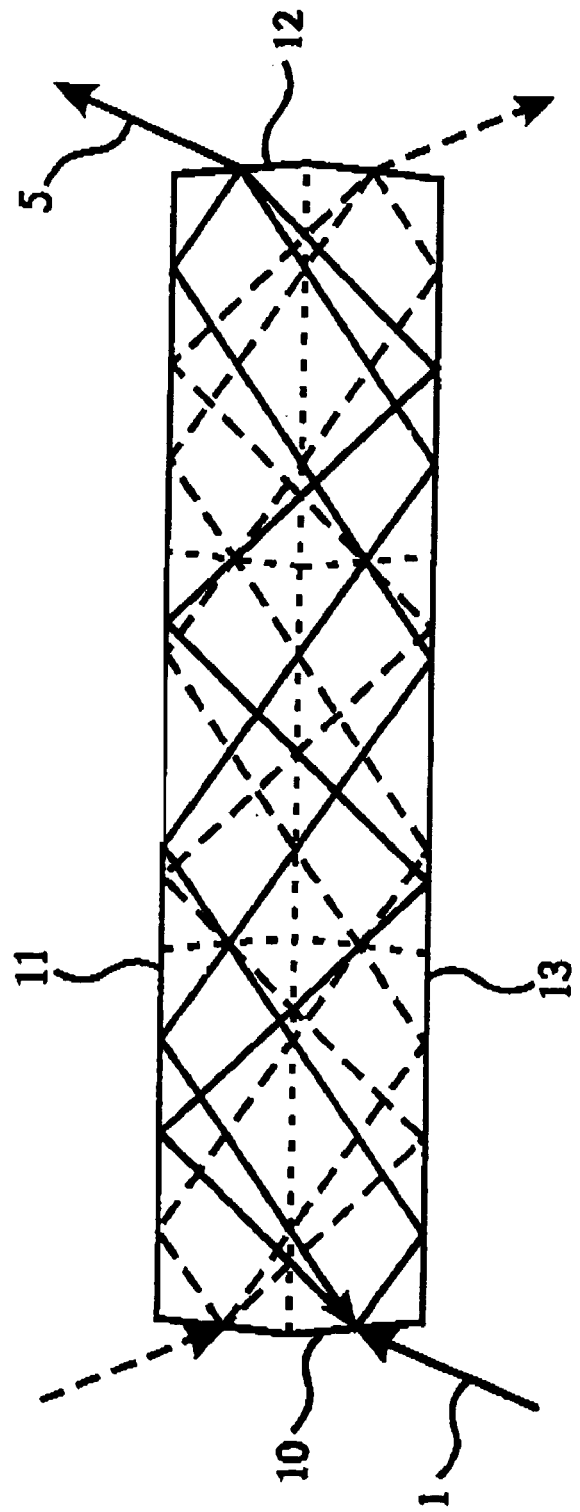
FIG. 11 is a diagram showing a laser rod that is equivalent to trapezoid-shaped basic cells that are linked in series-parallel fashion.

Rods formed by linking parallelogram-shaped basic cells in parallel can themselves be further linked two at a time in series to form a series-parallel linkage, thus giving a laser rod with two sets of triple paths. Accordingly, the number of series connections becomes 3, 5, 7 or other odd numbers. This becomes a slab rod with a hexagonal cross section, as expected. In this case also, the optical paths are the same as in the parallel connection of two basic cells. The rod shown in FIG. 11 illustrates an example of a laser rod formed by connecting in series three trapezoidal basic cells with numbers of side-face reflections of (2, 3), and connecting two sets of these in parallel at their side faces.

Figure 12:
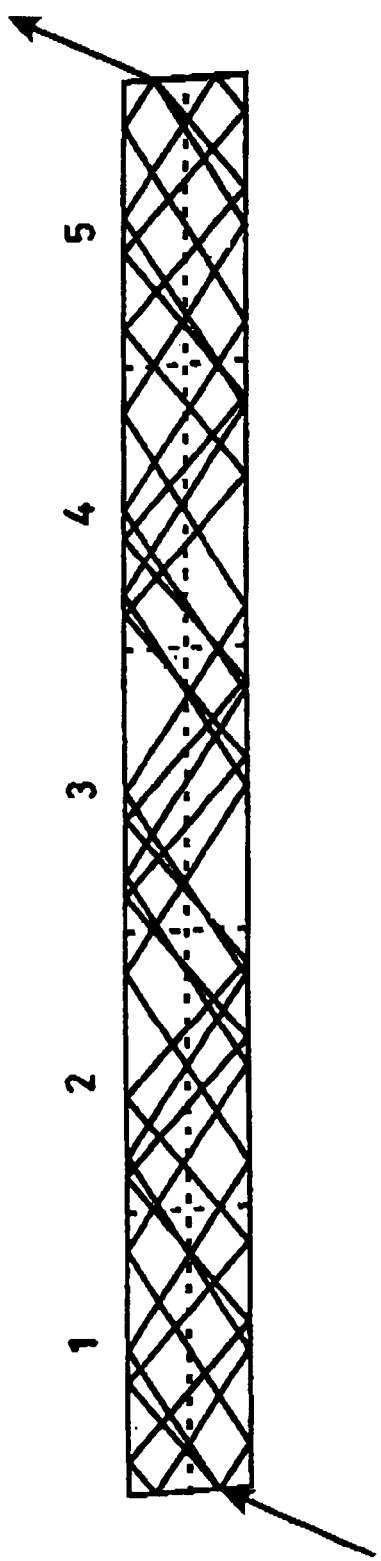
FIG. 12 is a diagram showing a laser rod that is equivalent to parallelogram-shaped basic cells that are linked in series-parallel fashion.

In the series-parallel linking described above where four more cells at a time are linked in series to the parallel-linked parallelogram-shaped basic cells, one set of quintuple paths is similarly formed. Accordingly, the number of cells connected in series becomes 5 cells, 9 cells, 13 cells and so on. In this case also, the optical paths are the same as when connecting two basic cells in parallel. As an example, FIG. 12 presents a rod formed by taking two sets of series-linked basic cells with numbers of side-face reflections of (3, 4) and further linking them in parallel.

Embodiment 5

Orthogonal Cutting of Series-Connected Trapezoidal Basic Cells

Figure 13:
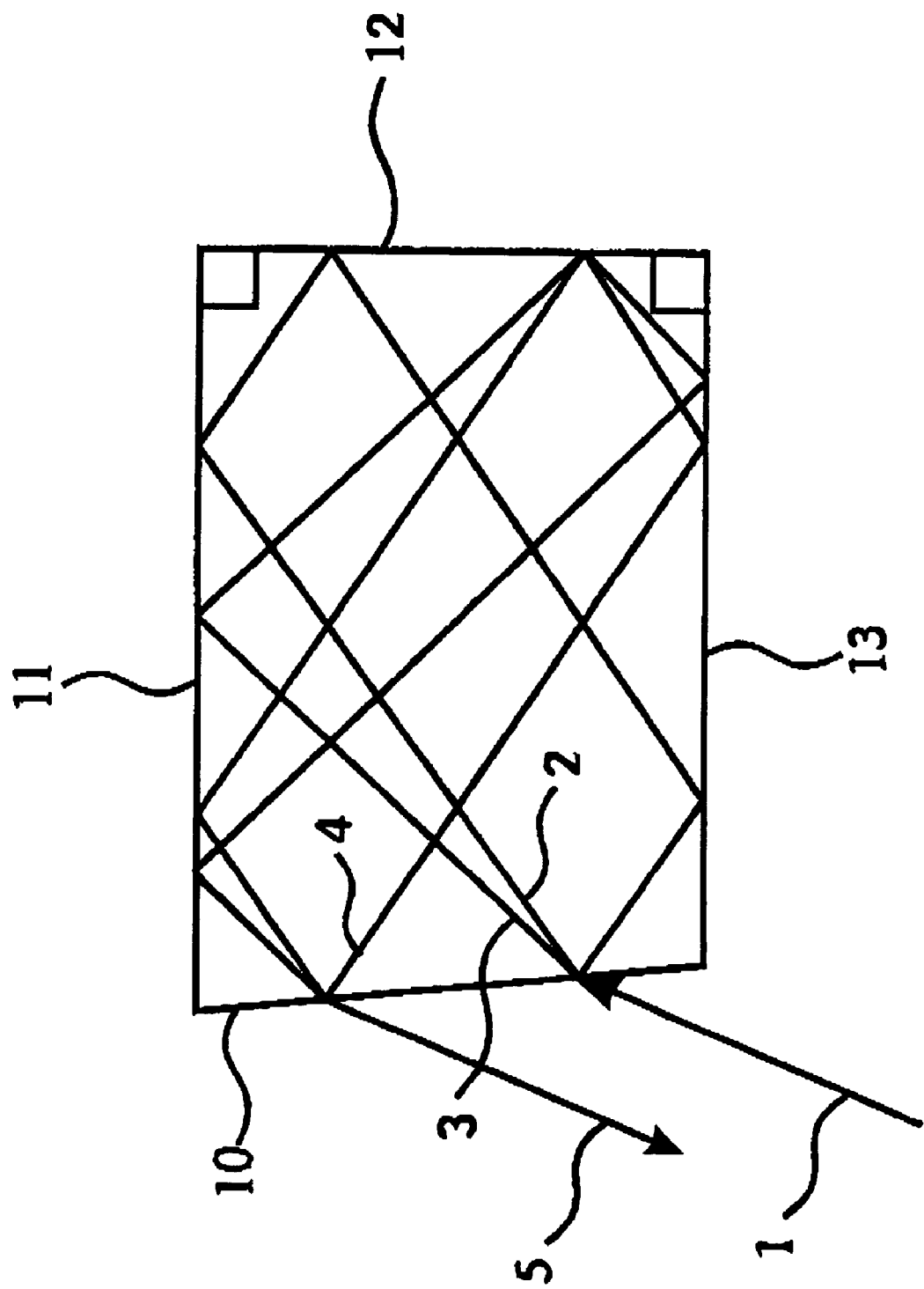
FIG. 13 is a diagram showing a laser rod that is equivalent to trapezoid-shaped basic cells that are linked in series-parallel fashion and cut orthogonally.

A laser rod having the shape of the aforementioned series connection of trapezoidal basic cells that is cut and polished at certain predetermined positions to form an end face orthogonal to the central axis gives one set of sextuple paths. The positions of the orthogonal end face are found at a position at one-half the basic cell length and additional positions found by adding one basic cell length at a time thereto. As an example, FIG. 13 shows a linked rod of a length of one-half the basic cell with a number of side-face reflections of (2, 3). This utilizes total reflection for the reflection at face 12 which is the cutting face. The light that is incident to the center of face 10 comes over the internal paths to the intersection of face 12 and face 13, where it is divided into two parts, so the light is incident either upon the lower half or the upper half of face 10.

Figure 14:
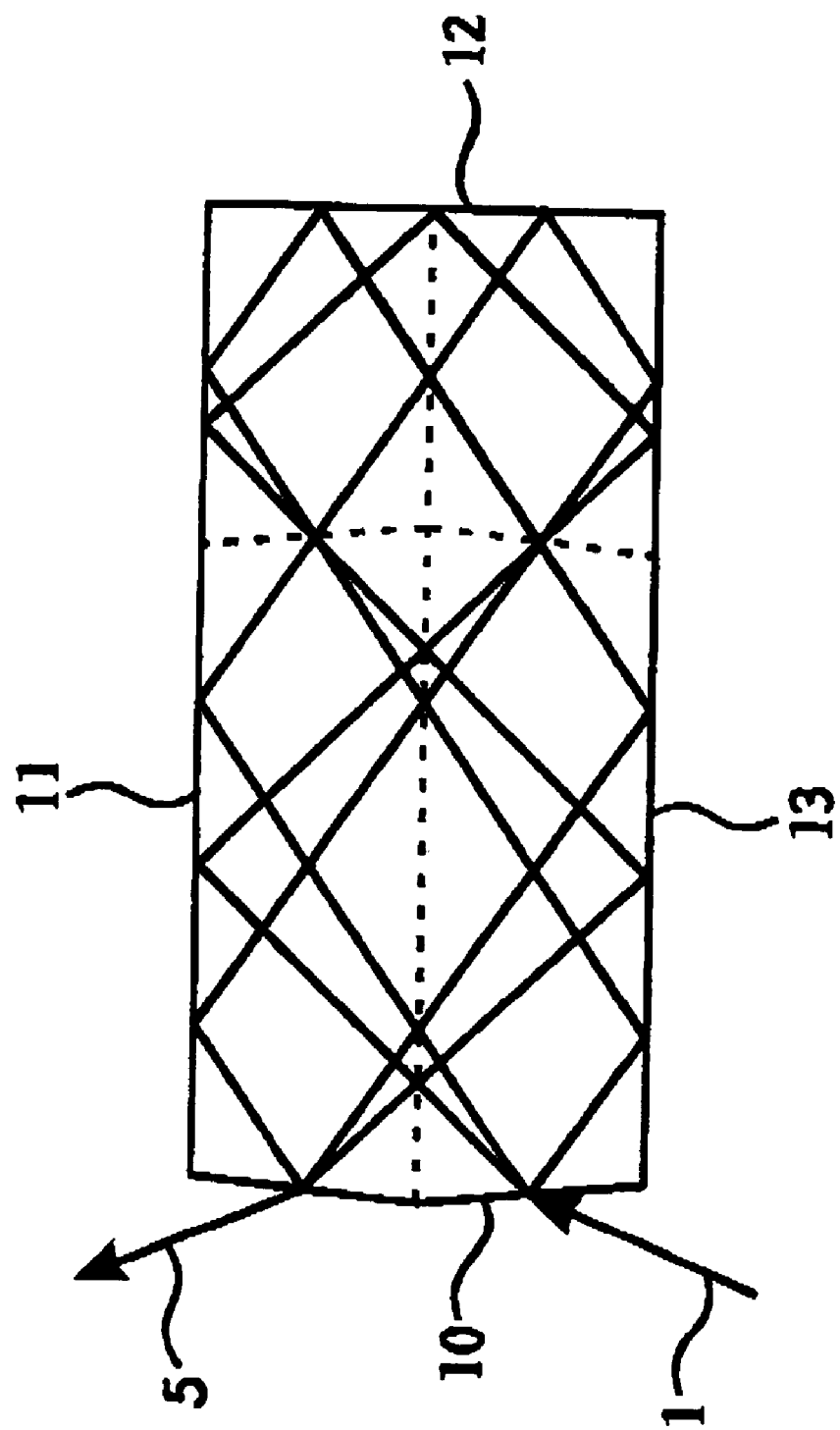
FIG. 14 is a diagram showing a laser rod that is equivalent to trapezoid-shaped basic cells that are linked in series-parallel fashion and cut orthogonally.

In a laser rod of a shape wherein the above series-connected trapezoidal basic cells are connected in parallel symmetrically about a side face, and with an end face polished orthogonally to the central axis similarly at a predetermined position, one set of sextuple paths can be constituted. The orthogonal end face is positioned at 1.5 the length of the basic cell and at positions found by adding two cells at a time. As one example, FIG. 14 illustrates a linked rod of a length of 1.5 cells. In this case, the reflection point on the orthogonal end face is moved slightly to the left, giving rise to a shift in the multiple paths from the paths of the basic cell. This can be corrected by shaping it such that the cross section of the laser beam passing through is maximized or by adjusting the position of incidence of laser light slightly.

Embodiment 6

Figure 15:
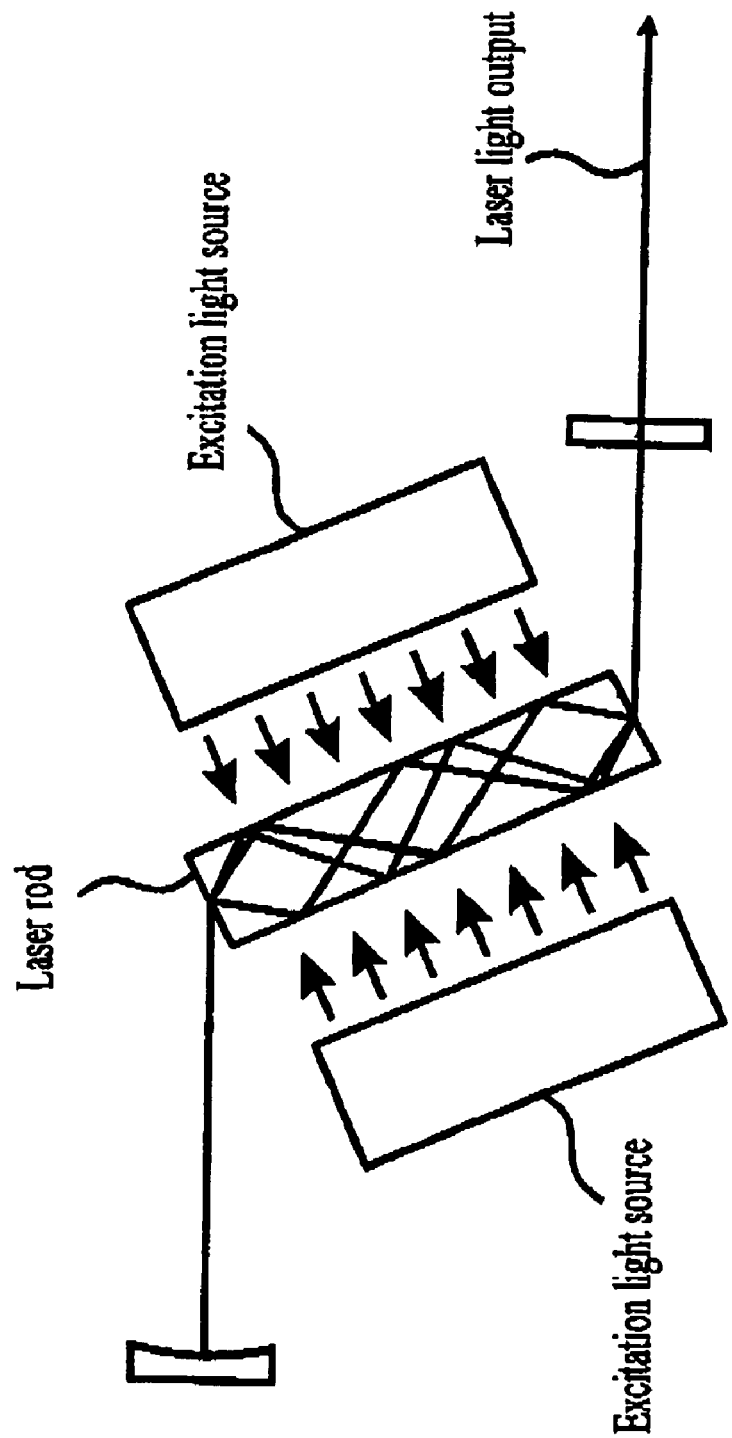
FIG. 15 is a schematic diagram of a laser oscillator.

FIG. 15 shows an example of an Nd:YAG laser. Excitation of the laser rod is performed by shining light from a lamp, LD, sunlight or other light source onto one of the side faces or top or bottom faces, or a combination thereof. A nonreflecting film in the excitation wavelength may be applied to these faces. Alternately, excitation light may be shined through the end face for the laser beam of the laser rod, thereby exciting it to create an end-pumped laser.

Embodiment 7

Figure 16:
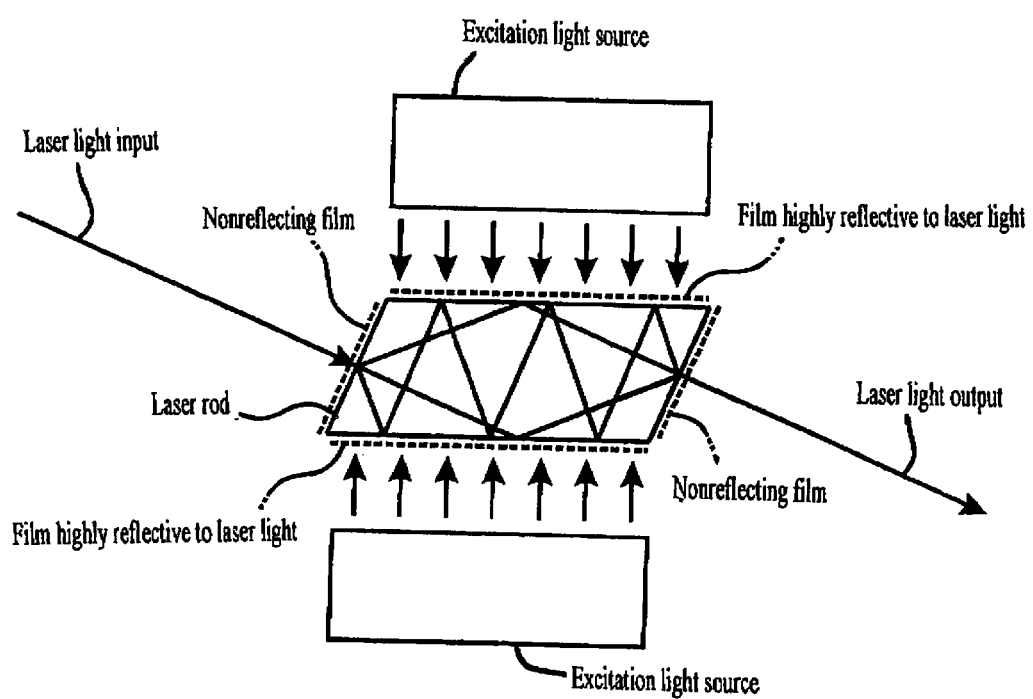
FIG. 16 is a schematic diagram of a laser amplifier.
Figure 19:
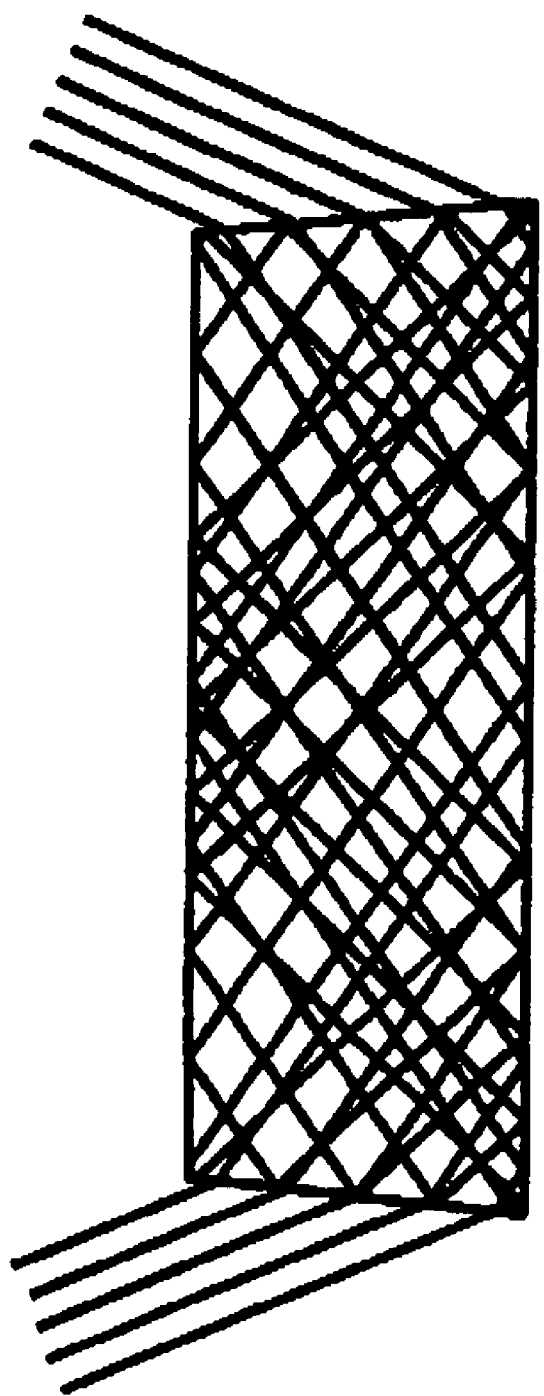
FIG. 19 is a light-path trace diagram for reflection iterations (2, 3).

As shown in FIG. 16, by applying a nonreflecting film to end face 10 or end face 11 of a laser rod with incident light orthogonal to the end faces and performing excitement from the side faces of the rod, it can be readily made into a laser amplifier with multiple paths provided within the laser rod.

Embodiment 8

As shown in FIG. 17, these laser rods can be connected in series to build a laser amplifier that can give even higher laser gain and a higher-power laser beam.

Embodiment 9

Figure 1:
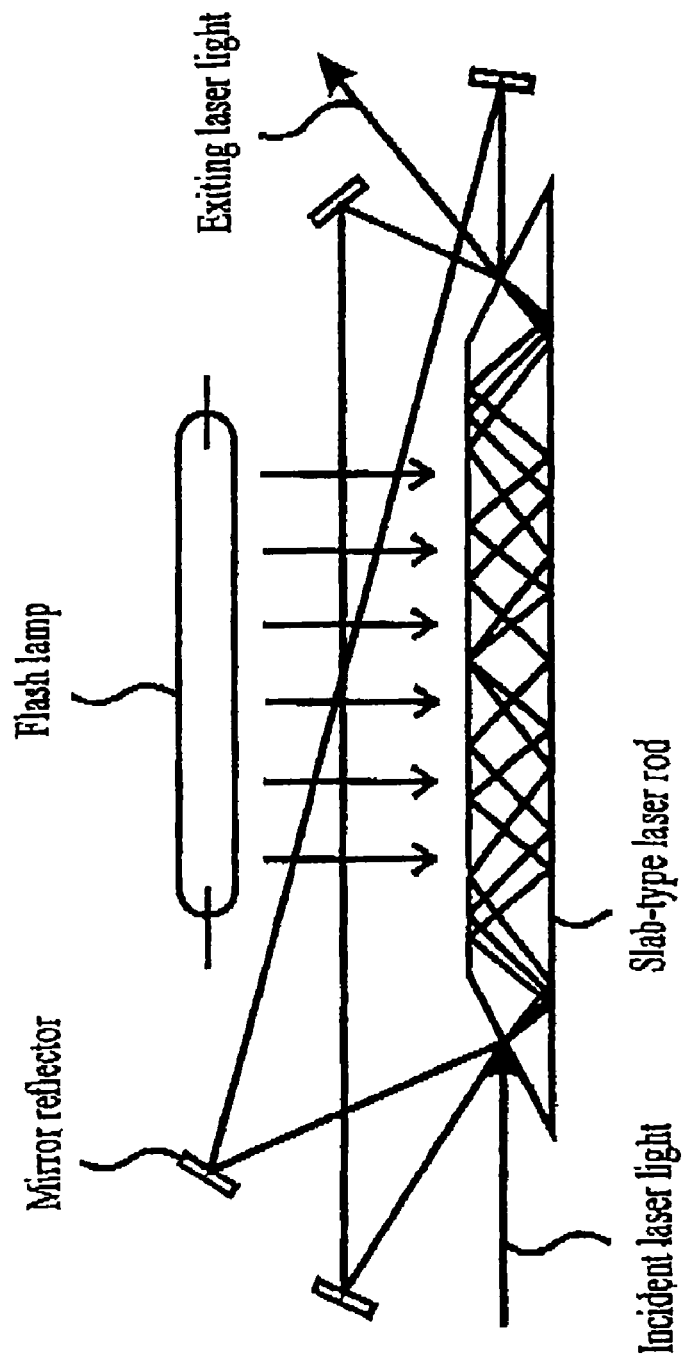
FIG. 1 is a diagram showing an example of a conventional multipath laser amplifier.
Figure 2:
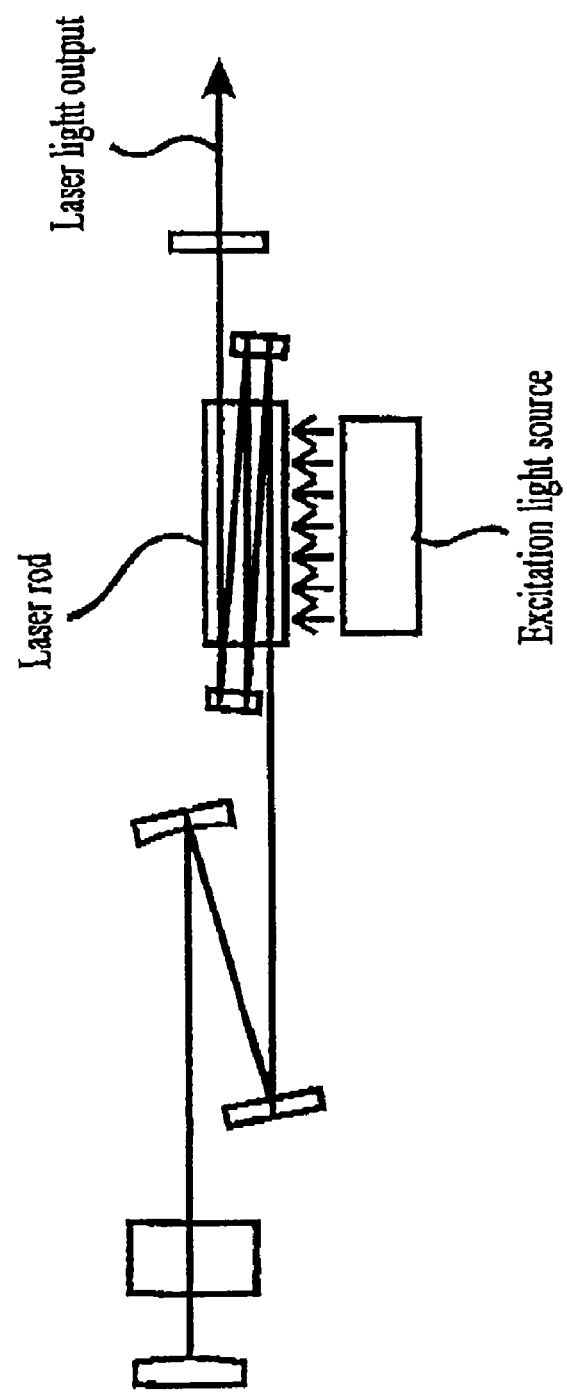
FIG. 2 is a diagram showing an example of a conventional laser oscillator using a multipath laser rod.

In order to apply this multipath laser rod to a nonlinear optical device, as shown in FIG. 18, the z-axis of a nonlinear optical crystal that can achieve 90-degree phase matching is oriented orthogonally to the slab and kept in a mount that maintains the phase-matching temperature. The orientation of the x-axis is arbitrary. For example, with a device that generates a second harmonic of the 1064 nm wavelength of the $LiNbO_3$ crystal, if the input light is polarized within the slab face and light is made incident to the device along the path shown in FIG. 1, then the second harmonic at a wavelength of 532 nm is polarized orthogonally and generated along the path. The second harmonic thus generated is polarized orthogonally to the slab, so reflection losses occur on the exit end face. In order to prevent this, one may use a crystal of the shape shown in FIG. 6 wherein laser light is incident vertically to the end face. Nonreflecting films for the fundamental wave and the double wave are applied to the end faces for light incidence and exit. This multipath nonlinear crystal can be used not only to generate harmonics but naturally also for parametric oscillation with the same constitution.

(1) Increasing Laser Rod Gain

The first advantage of the multipath laser rod according to the present invention lies in that an optical path length much longer than the length of the laser rod can be established within the laser rod. The effect of this long optical path length is equivalent to multiplying the induced emission coefficient of the laser-active ions by the number of multiple paths, so the laser gain can be thus increased. In comparison to the case in which multiple optical paths are created within the laser rod using external reflectors as in the prior art, the present invention has an advantage in that there are no optical losses due to a nonreflecting film at the rod end face. Optical losses can be suppressed in this manner, so the laser rod can be operated closer to saturation amplification, and the energy stored in the laser rod can be converted to laser light more efficiently. With the present invention, light can be passed through the rod six or more times without using the optical devices normally provided outside of the laser rod, so from the standpoint of the number of components, the optical portions of an amplifier can be constructed with only a laser rod and excitation light source. Thereby, an even more compact, high-performance and reliable apparatus can be easily obtained.

(2) Increasing Excitation Light Absorbance and Averaging Excitation Distribution The second advantage lies in that the multiple paths overlap at angles inclined with respect to the central axis of the rod, so the optical paths are longer by that amount, and so there is an effect of increasing the volume in which excitation light is absorbed (the absorption volume) in comparison to the case of no overlapping. In addition, the excitation light absorbance thereby increases. Laser rods are typically side-face excited, so when the excitation light absorbance approaches 100%, the excitation rate on the side opposite the excitation face drops, giving rise to a strong heterogeneity in the excitation distribution. However, the direction of propagation of laser light is at an angle to the central axis of the rod, so the heterogeneous excitation distribution and concomitant refractive index fluctuations and other optical heterogeneity are averaged out when viewed as laser light, and as a result, good amplification characteristics are obtained and good transverse-mode laser light can be readily obtained.

(3) Ease of Manufacture

Devices using the present invention can be completed by simply performing the optical polishing of at least four faces. In addition, while it is typically easy to achieve good angular precision at the time of forming faces in the polishing process, achieving high dimensional precision is difficult. With the laser rod used in the present invention, even if there is a certain amount of manufacturing error in dimensions and angles, these can be corrected by adjusting the angles of incidence and exit of laser light. Accordingly, high precision is not required in manufacture, so manufacture is simplified.

(4) Characteristics when the Present Invention is Applied to Nonlinear Optical Devices Typically, nonlinear optical crystals are optically homogeneous, large crystals that are difficult to manufacture and expensive. In addition, nonlinear optical effects are greatly affected by even slight optical heterogeneity, so there is a drawback in that light generated or converted by nonlinear optical effects readily has its mode disturbed.

In addition, even being nonlinear optical devices, their nonlinear optical coefficients themselves are small, so when generating or converting light with nonlinear optical effects, high-intensity, high-density input light is required. At this time, even slight differences in optical absorption by nonlinear optical crystals may give rise to large heterogeneous temperature distributions. These large heterogeneous temperature distributions may cause the refractive index and other optical characteristics of the nonlinear optical crystal to become heterogeneous, thus disturbing the phase matching conditions, so the modes of the light generated readily deteriorate.

In contrast, if the laser rods used in the present invention are applied to nonlinear optical crystals, large nonlinear optical effects are obtained from the long interaction lengths due to the long optical paths, and there are also meritorious effects in that the temperature distribution and other types of heterogeneity are also averaged from the view of the laser light, so good transverse-mode converted light can be readily obtained. Among the various nonlinear optical crystals, the present invention is particularly applicable to $LiNbO_3$ and $MgO:LiNbO_3$ and other optically uniaxial crystals whereby Type I 90-degree phase matching can be obtained.

What is claimed is:

1. A laser apparatus using a multipath solid-state slab laser rod that has a trapezoid or parallelogram-shaped cross section by a plane including an optical path in the slab and that has a light amplifying effect, comprising:
   a solid-state slab laser rod that is able to amplify incident light and has an end face A, an end face B which faces the end face A, two parallel side faces C and D, adjacent to the end faces A and B and slab top and slab bottom faces E and F providing a light propagation path between the end faces A and B through one or more reflections on the side faces, and
   an excitation light source that excites the solid-state slab laser rod from any of the six faces A through F,
   wherein the light that is incident through the end face A:
   (1) is reflected at the side face C or the side face D one or more times to propagate towards the end face B,
   (2) is reflected at the end face B by total internal reflection with an incidence angle greater than the critical angle of the slab medium,
   (3) is reflected at the side face C or the side face D one or more times to propagate back to end face A, and
   (4) is reflected at the end face A by the total internal reflection with an incidence angle greater than the critical angle, successively, and after repeating this light propagation through (1) to (4) one or more times, the propagating light is reflected at the side face C or the side face D one or more times to reach towards the end face B and falls on the end face B with an incidence angle less than the critical angle to be refracted out from the end face B, as amplified light.

2. A laser apparatus using a multipath solid-state slab laser rod of claim 1 that has a trapezoid or parallelogram-shaped cross section by a plane including an optical path in the slab and that is made of a nonlinear optical crystal having a nonlinear optical effect, comprising:
   a device that has a nonlinear optical effect on incident light and has the end face A, the end face B, the two parallel side faces C and D, adjacent to the end faces A and B and the slab top and slab bottom faces E and F providing a light propagation path between the end faces A and B through one or more reflections at the side faces,
   wherein the end face A and the end face B face each other and the light that is incident upon the end face A:
   (1) is reflected at the side face C or the side face D one or more times to propagate towards the end face B,
   (2) is reflected at the end face B by total internal reflection with an incidence angle greater than the critical angle of the slab medium,
   (3) is reflected at the side face C or the side face D one or more times to propagate back to end face A, and
   (4) is reflected at the end face A by total internal reflection at the face A, successively,
   and after repeating this light propagation through (1) to (4) one or more times the propagating light is reflected at the side face C or the side face D one or more times to reach the end face B, and the light generated by the nonlinear optical effect falls on the end face B with an incidence angle less than the critical angel to be refracted out from the end face B.

3. A laser apparatus using a multipath solid-state slab laser rod that has a cross section by a plane including an optical path in the slab to be a shape equivalent to a trapezoid X including an end face $A_X$, side an end face $B_X$, a side face $C_X$ and a side face $D_X$ joined to another trapezoid Y having the same shape as the trapezoid X and including an end face $A_Y$, an end face $B_Y$, a side face $C_Y$ and a side face $D_Y$, by contacting the side faces $D_X$ and $D_Y$ to form a united single slab, and that has a light amplifying effect, comprising:
   the solid-state slab laser rod that is able to amplify incident light and has slab top and slab bottom faces E and F providing a light propagation path between the end faces $A_X$ and $A_Y$ through one or more reflections at the parallel side faces $C_X$, $C_Y$, $D_X$ and $D_Y$, and
   an excitation light source that excites the solid-state slab laser rod through one of the eight faces $A_X$, $B_X$, $A_Y$, $B_Y$, $C_X$, $C_Y$, E and F, wherein the end face $A_Y$ and the end face $B_X$ face each other, and the light that is incident through the end face $A_Y$:
- (1) is reflected at the side face $C_X$ or the side face $C_Y$ one or more times to propagate towards the end face $B_X$,
- (2) is reflected at the end face $B_x$ by total internal reflection with an incidence angle greater than the critical angle of the slab medium,
- (3) is reflected at the side face $C_X$ or the side face $C_Y$ one or more times to propagate back to the end face $A_x$ or the end face $A_Y$,
- (4) is reflected on the end face $A_x$ or the end face $A_Y$ by total internal reflection with an incidence angle greater than the critical angle, and
- (5) is reflected at the side face $C_X$ or the side face $C_Y$ to propagate one or more times towards the end face $B_x$ or the end face $B_Y$, successively, and the amplified light falls on the end face $B_X$ or the end face $B_Y$ with an incidence angle less than the critical angle to be refracted out from the end face $B_X$ or the end face $B_Y$.

4. A laser apparatus using a multipath solid-state slab laser rod that has a cross section by a plane including an optical path in the slab to be a shape equivalent to a parallelogram X including an end face $A_X$, an end face $B_X$, a side face $C_X$ and a side face $D_X$ joined to a parallelogram Y having the same shape as the parallelogram X and including an end face $A_Y$, an end face $B_Y$, a side face $C_Y$ and a side face $D_Y$ to form a single slab, and that has a light amplifying effect, comprising:

the solid-state slab laser rod that is able to amplify incident light and has slab top and slab bottom faces E and F providing a light propagation path between the end faces $A_X$ and $A_Y$ through one or more reflections at the side faces, and an excitation light source that excites the solid-state slab laser rod through one of the eight faces $A_X$, $B_X$, $A_Y$, $B_Y$, $C_X$, $D_Y$, E and F, wherein the end face $A_Y$ and the end face $B_X$ face each other, and the light that is incident through the end face $A_Y$:
- (1) is reflected at the side face $C_X$ or the side face $D_Y$ one or more times to propagate towards the end face $B_Y$,
- (2) is reflected on the end face $B_Y$ by total internal reflection with an incidence angle greater than the critical angle of the slab medium,
- (3) is reflected at the side face $C_X$ or the side face $D_Y$ one or more times to propagate back to the end face $A_Y$,
- (4) is reflected on the end face $A_Y$ by total internal reflection with an incidence angle greater than the critical angle,
- (5) is reflected at the side face $C_X$ or the side face $D_Y$ one or more times to propagate to the end face $B_X$,
- (6) is reflected at the end face $B_X$ by total internal reflection with an incidence angle greater than the critical angle,
- (7) is reflected at the side face $C_X$ or the side face $D_Y$ one or more times to propagate back to the end face $A_X$,
- (8) is reflected at the end face $A_X$ by total internal reflection with an incidence angle greater than the critical angle, and
- (9) is reflected at the side face $C_X$ or the side face $D_Y$ one or more times to propagate to the end face $B_X$, successively, and falls on the end face $B_X$ with an incidence angle less than the critical angle to be refracted out from the end face $B_X$, as an amplified light.

5. A laser apparatus using a multipath solid-state slab laser rod that has a cross section by a plane including an optical path in the slab to be a shape equivalent to a right trapezoid having two adjacent right angles, where the two right trapezoids formed by bisecting this right trapezoid along a line parallel to its base are a trapezoid X including an end face $A_X$, an end face $B_X$, a side face $C_X$ and side face $D_X$ and another trapezoid Y having the same shape with the trapezoid X including an end face $A_Y$, an end face $B_Y$, a side face $C_Y$ and a side face $D_Y$, where the right trapezoids are such that the side face $D_X$ lies atop the side face $C_Y$ to form a single slab, and that has a light amplifying effect, comprising:

a solid-state slab laser rod that is able to amplify incident light and has the end face $A_X$, the end face $A_Y$, the two parallel side faces $C_X$ and $D_Y$ which face each other and slab top and slab bottom faces E and F, and provides a light propagation path between the end faces $A_X$ and $A_Y$ through one or more reflections at the parallel faces, and an excitation light source that excites the solid-state slab laser rod from one of the eight faces $A_X$, $B_X$, $A_Y$, $B_Y$, $C_X$, $D_Y$, E and F, wherein the light that is incident through the end face $A_Y$ and exits from the end face $A_X$:
- (1) is reflected at the side face $C_X$ or the side face $D_Y$ one or more times to propagate towards the end face $B_X$,
- (2) is reflected at the end face $B_X$ by total internal reflection with an incidence angle greater than the critical angle of the slab medium,
- (3) is reflected at the side face $C_X$ or the side face $D_Y$ one or more times to propagate towards the end face $A_Y$,
- (4) is reflected at the end face $A_Y$ by total internal reflection with an incidence angle greater than the critical angle,
- (5) is reflected at the side face $C_X$ or the side face $D_Y$ one or more times to propagate towards the end face $B_Y$,
- (6) is reflected at the end face $B_Y$ by total internal reflection with an incidence angle greater than the critical angle,
- (7) is reflected at the side face $C_X$ or the side face $D_Y$ one or more times,
- (8) is reflected by total internal reflection to propagate towards the end face $A_X$,
- (9) is reflected at the side face $C_X$ or the side face $D_Y$ one or more times to propagate toward the end face $B_Y$,
- (10) is reflected at the end face $B_Y$ by total internal reflection with an internal incidence angle greater than the critical angle,
- (11) is reflected at the side face $C_X$ or the side face $D_Y$ one or more times to propagate towards the end face $A_X$, successively, and the amplified light falls on the end face $A_X$ with an incidence angle less than the critical angle to be refracted out from the end face $A_X$.

6. A laser apparatus using a multipath solid-state slab laser rod which has a cross section by a plane including an optical path in the slab to be a shape equivalent to a right trapezoid having two adjacent right angles, where the two right trapezoids formed by bisecting the right trapezoid along a line parallel to its base are a right trapezoid X including an end face $A_X$, an end face $B_X$, a side face $C_X$ and a side face $D_X$ and a similar right trapezoid Y including an end face $A_Y$, an end face $B_Y$, a side face $C_Y$ and a side face $D_Y$, where the side face $D_X$ lies atop the side face $D_Y$, and that has a light amplifying effect, comprising:

a solid-state slab laser rod which is able to amplify incident light and has the end face $A_Y$, the end face $A_X$, the two parallel side faces $C_X$ and $C_Y$ which face each other and provides a light propagation path between the end faces $A_X$ and $A_Y$ through one or more reflections at the parallel faces and slab top and slab bottom faces E and F, and an excitation light source that excites the solid-state slab laser rod from one of the eight faces $A_X$, $B_X$, $A_Y$, $B_Y$, $C_X$, $C_Y$, E and F, wherein the light that is incident through the end face $A_Y$:
(1) is reflected at the side face $C_X$ or the side face $C_Y$ one or more times to propagate towards the end face $B_Y$,
(2) is reflected at the end face $B_Y$ by total internal reflection with an incidence angle greater than the critical angle of the slab medium,
(3) is reflected at the side face $C_X$ or the side face $C_Y$ one or more times to pro a ate towards the end face $A_X$,
(4) is reflected at the end face $A_X$ by total internal reflection with an incidence angle greater than the critical angle,
(5) is reflected at the side face $C_X$ or the side face $C_Y$ one or more times to pro a ate toward the end face $B_X$ or the end face $B_Y$,
(6) is reflected at the end face $B_X$ or the end face $B_Y$ by total internal reflection with an incidence angle greater than the critical angle,
(7) is reflected at the side face $C_X$ or the side face $C_Y$ one or more times to propagate toward the end face $A_Y$,
(8) is reflected at the end face $A_Y$ by total internal reflection with an incidence angle greater than the critical angle,
(9) is reflected at the side face $C_X$ or the side face $C_Y$ one or more times to propagate toward the end face $B_X$,
(10) is reflected at the end face $B_X$ by total internal reflection with an incidence angle greater than the critical angle, and
(11) is reflected at the side face $C_X$ or the side face $C_Y$ one or more times to propagate towards the end face $A_X$, successively, and falls on the end face $A_X$ with an incidence angle less than the critical angle to be refracted out from the end face $A_X$, as amplified light.

7. The laser apparatus using a multipath solid-state slab laser rod according to any one of claims 1 to 6, wherein the solid-state slab laser rod has a light amplifying effect and wherein excitation light is irradiated through any of the side faces, and a thermal conductor is attached to either the slab top face E or the slab bottom face F or both faces to dissipate heat from the slab laser rod.

8. The laser apparatus using a multipath solid-state slab laser rod according to claim 2, further comprising an anti-reflection film that is a film transparent to the excitation light provided upon the excitation light incident face.

9. The laser apparatus using a multipath solid-state slab laser rod according to any one of claims 1 to 6, wherein an angle of incidence of light with respect to the light-incident face A is made the Brewster angle.

10. The laser apparatus using a multipath solid-state slab laser rod according to any one of claims 1 to 6, wherein an angle of incidence of light with respect to the light-incident face A is less than the Brewster angle, and an anti-reflection film with respect to the incident light is provided on the light-incident face.

11. The laser apparatus using a multipath solid-state slab laser rod according to any one of claims 1 to 6, wherein total reflection is used for the reflections at the face C and the face D.

12. The laser apparatus using a multipath solid-state slab laser rod according to any one of claims 1 to 6, further comprising a reflective film that reflects the incident light from an interior of the slab laser rod provided on the face C and the face D.

* * * * *